United States Patent
Yang et al.

(10) Patent No.: US 9,014,131 B2
(45) Date of Patent: Apr. 21, 2015

(54) METHOD FOR TRANSMITTING AND RECEIVING CONTROL INFORMATION AND APPARATUS FOR THE SAME

(71) Applicant: LG Electronics Inc., Seoul (KR)

(72) Inventors: Suckchel Yang, Anyang-si (KR); Hanbyul Seo, Anyang-si (KR); Joonkui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/356,462

(22) PCT Filed: Oct. 31, 2013

(86) PCT No.: PCT/KR2013/009774
§ 371 (c)(1),
(2) Date: May 6, 2014

(87) PCT Pub. No.: WO2014/069910
PCT Pub. Date: May 8, 2014

(65) Prior Publication Data
US 2014/0307695 A1    Oct. 16, 2014

Related U.S. Application Data

(60) Provisional application No. 61/720,396, filed on Oct. 31, 2012, provisional application No. 61/756,466, filed on Jan. 25, 2013, provisional application No. 61/763,971, filed on Feb. 13, 2013, provisional application No. 61/814,830, filed on Apr. 23, 2013.

(51) Int. Cl.
*H04L 1/18* (2006.01)
*H04W 72/04* (2009.01)

(52) U.S. Cl.
CPC ............... *H04L 1/1812* (2013.01); *H04L 1/18* (2013.01); *H04W 72/0406* (2013.01)

(58) Field of Classification Search
CPC .......... H04W 72/042; H04W 72/0406; H04W 72/0413; H04L 1/1812; H04L 1/18; H04L 1/00
USPC ................ 370/310, 328–330, 335–338, 252; 455/68, 69
See application file for complete search history.

(56) References Cited

U.S. PATENT DOCUMENTS

2009/0086704 A1* 4/2009 Ho ................................ 370/346
2012/0213163 A1* 8/2012 Lee et al. ...................... 370/329

OTHER PUBLICATIONS

Catt, "PUCCH resource for E-PDCCH," 3GPP TSG RAN WG1 Meeting #70, R1-123227, Aug. 2012, 4 pages.

(Continued)

*Primary Examiner* — Un C Cho
*Assistant Examiner* — Siming Liu
(74) *Attorney, Agent, or Firm* — Lee, Hong, Degerman, Kang & Waimey

(57) ABSTRACT

The present invention relates to a wireless communication and, more specifically, to a method for transmitting an HARQ) response by a UE in a wireless communication system, and an apparatus for the same. The method includes receiving an E-PDCCH signal on at least one of a plurality of enhanced physical downlink control channel (E-PDCCH) sets, each E-PDCCH set including a plurality of resources units indexed per E-PDCCH set; and transmitting the HARQ response using a physical uplink control channel (PUCCH) resource determined using the index of the first resource unit among one or more resource units carrying the E-PDCCH signal, wherein the index of the first resource unit is determined on the basis of the E-PDCCH set having the lowest index among the plurality of E-PDCCH sets when specific conditions are satisfied.

16 Claims, 19 Drawing Sheets

(56) References Cited

OTHER PUBLICATIONS

Panasonic, "Remaining issues on PUCCH resource allocation for EPDCCH," 3GPP TSG-RAN WG1 Meeting #70bis, R1-124243, Oct. 2012, 8 pages.

Huawei et al., "PUCCH ACK/NACK resource allocation for ePDCCH," 3GPP TSG RAN WG1 Meeting #70, R1-123122, Aug. 2012, 6 pages.

NTT DOCOMO, "Views on PUCCH Resource Allocation for ePDCCH," 3GPP TSG RAN WG1 Meeting #70, R1-123554, Aug. 2012, 5 pages.

* cited by examiner

# METHOD FOR TRANSMITTING AND RECEIVING CONTROL INFORMATION AND APPARATUS FOR THE SAME

CROSS-REFERENCE TO RELATED APPLICATIONS

This application is the National Stage filing under 35 U.S.C. 371 of International Application No. PCT/KR2013/009774, filed on Oct. 31, 2013, which claims the benefit of U.S. Provisional Application Nos. 61/720,396, filed on Oct. 31, 2012, 61/756,466, filed on Jan. 25, 2013, 61/763,971, filed on Feb. 13, 2013, and 61/814,830, filed on Apr. 23, 2013, the contents of which are all hereby incorporated by reference herein in their entirety.

TECHNICAL FIELD

The present invention relates to a wireless communication system and, more particularly, to a method for transmitting and receiving control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

Disclosure

Technical Problem

An object of the present invention devised to solve the problem lies in a method for efficiently transmitting/receiving control information in a wireless communication system and an apparatus for the same. Another object of the present invention is to provide a method for efficiently transmitting/receiving a control channel signal and an apparatus for the same.

The technical problems solved by the present invention are not limited to the above technical problems and those skilled in the art may understand other technical problems from the following description.

Technical Solution

The object of the present invention can be achieved by providing a method for transmitting a hybrid automatic repeat request (HARQ) response by a UE in a wireless communication system, the method including: receiving an enhanced physical downlink control channel (E-PDCCH) signal on at least one of a plurality of E-PDCCH sets, each E-PDCCH set including a plurality of resources units indexed per E-PDCCH set; and transmitting the HARQ response using a physical uplink control channel (PUCCH) resource determined using the index of the first resource unit among one or more resource units carrying the E-PDCCH signal, wherein the index of the first resource unit is determined on the basis of the E-PDCCH set having the lowest index among the plurality of E-PDCCH sets when specific conditions including i), ii) and iii) are satisfied,
 i) the plurality of E-PDCCH sets are scrambled with the same sequence,
 ii) the UE is configured to monitor E-PDCCH candidates having the same attribute as the E-PDCCH signal in the plurality of E-PDCCH sets,
 iii) a plurality of E-PDCCH candidates corresponding to the E-PDCCH signal in the plurality of E-PDCCH sets are mapped to the same physical resource.

In another aspect of the present invention, provided herein is a UE configured to transmit a HARQ response in a wireless communication system, the UE including: a radio frequency (RF) unit; and a processor, wherein the processor is configured to receive an E-PDCCH signal on at least one of a plurality of E-PDCCH sets, each E-PDCCH set including a plurality of resources units indexed per E-PDCCH set and to transmit the HARQ response using a PUCCH resource determined using the index of the first resource unit among one or more resource units carrying the E-PDCCH signal, wherein the index of the first resource unit is determined on the basis of the E-PDCCH set having the lowest index among the plurality of E-PDCCH sets when specific conditions including i), ii) and iii) are satisfied,
 i) the plurality of E-PDCCH sets are scrambled with the same sequence,
 ii) the UE is configured to monitor E-PDCCH candidates having the same attribute as the E-PDCCH signal in the plurality of E-PDCCH sets,
 iii) a plurality of E-PDCCH candidates corresponding to the E-PDCCH signal in the plurality of E-PDCCH sets are mapped to the same physical resource.

The E-PDCCH candidates having the same attribute as the E-PDCCH signal may include E-PDCCH candidates having the same DCI payload size as the E-PDCCH signal.

The E-PDCCH candidates having the same attribute as the E-PDCCH signal may include E-PDCCH candidates having the same RNTI as the E-PDCCH signal. Here, the RNTI may be used to scramble a CRC of the E-PDCCH signal.

The RNTI may include a cell-RNTI (C-RNTI) or a semi-persistent scheduling (SPS) C-RNTI.

Each E-PDCCH set may include one or more physical resource blocks (PRBs).

The plurality of resource units may include a plurality of enhanced control channel elements (eCCEs).

The method may further include receiving a physical downlink shared channel (PDSCH) signal indicated by the E-PDCCH signal, wherein the HARQ response includes acknowledgement information for the PDSCH.

When the E-PDCCH signal includes information indicating SPS release, the HARQ response includes acknowledgement information for the E-PDCCH.

Advantageous Effects

According to the present invention, it is possible to efficiently transmit/receive control information in a wireless communication system. In addition, it is possible to efficiently transmit/receive a control channel signal.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
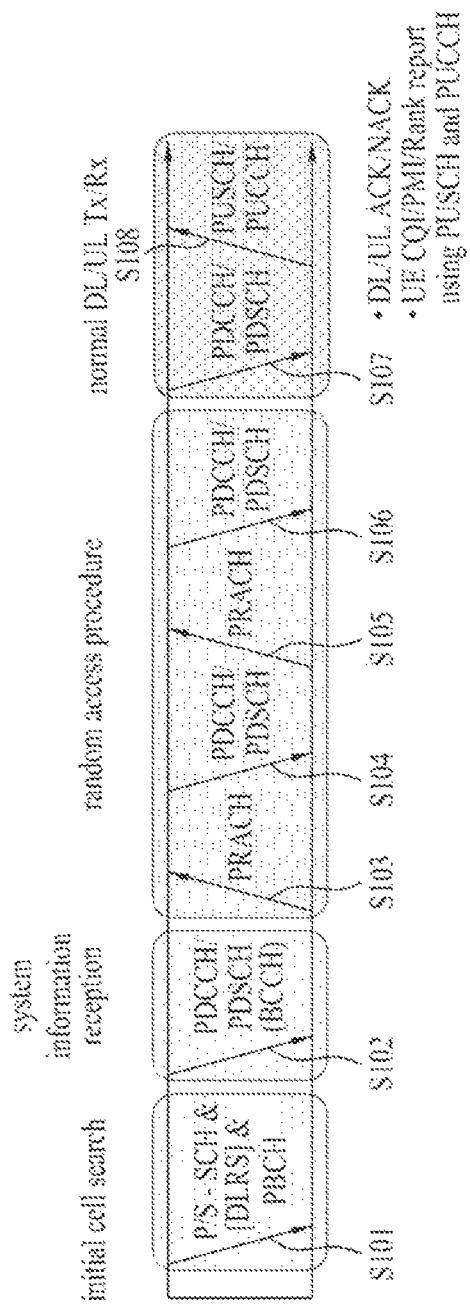
FIG. 1 illustrates physical channels used in LTE(-A) and a signal transmission method using the same.

FIG. 1 illustrates physical channels used in LTE(-A) and a signal transmission method using the same.

Referring to FIG. 1, when powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step 102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure.

Figure 2:
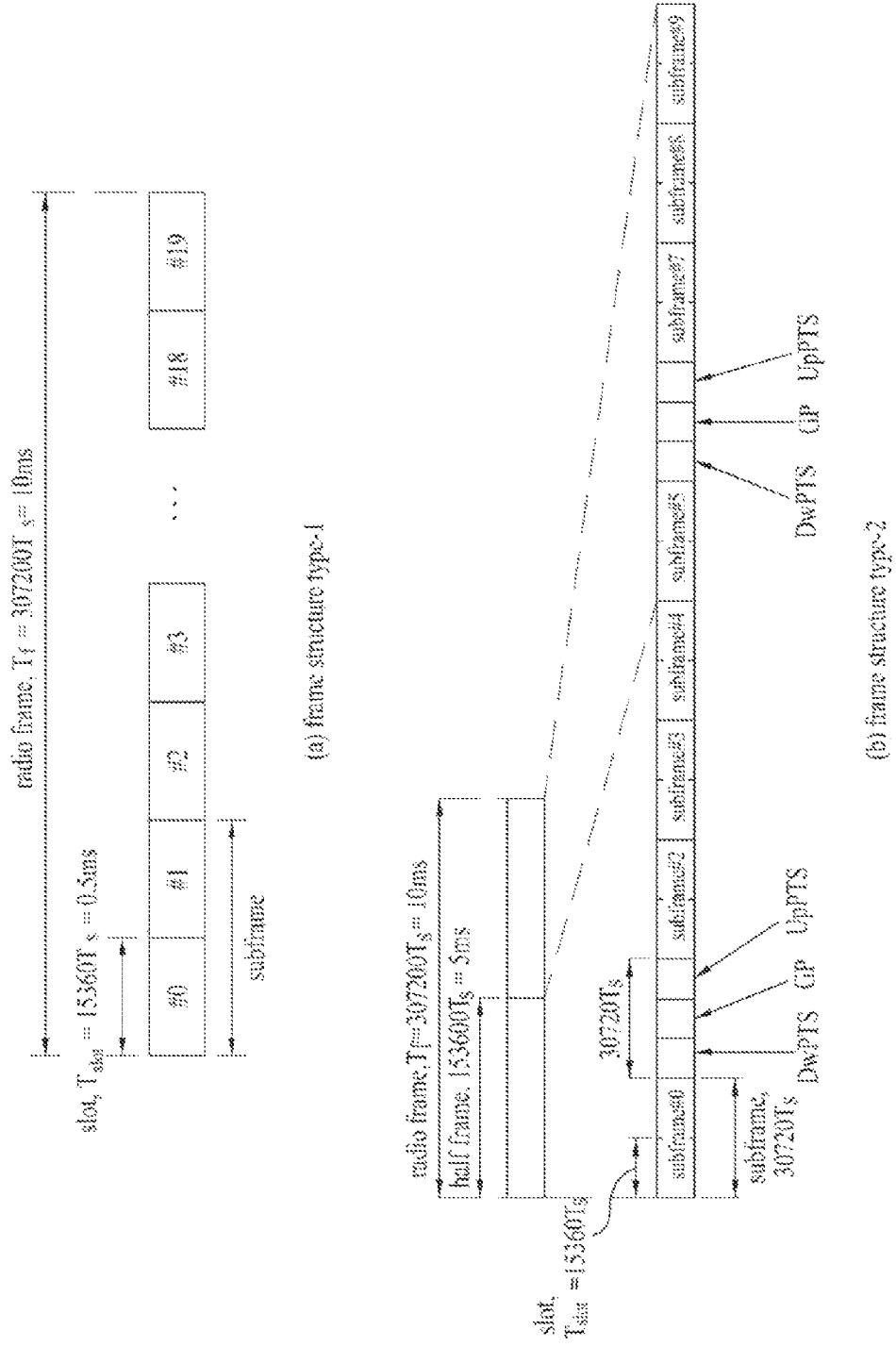
FIG. 2 illustrates a radio frame structure for use in LTE(-A)

FIG. 2 illustrates a radio frame structure for use in LTE(-A). Uplink/downlink data packet transmission is performed on a subframe-by-subframe basis. A subframe is defined as a predetermined time interval including a plurality of symbols. A type-1 radio frame structure applicable to FDD (Frequency Division Duplex) and a type-2 radio frame structure applicable to TDD (Time Division Duplex) are used.

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE(-A), an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Figure 3:
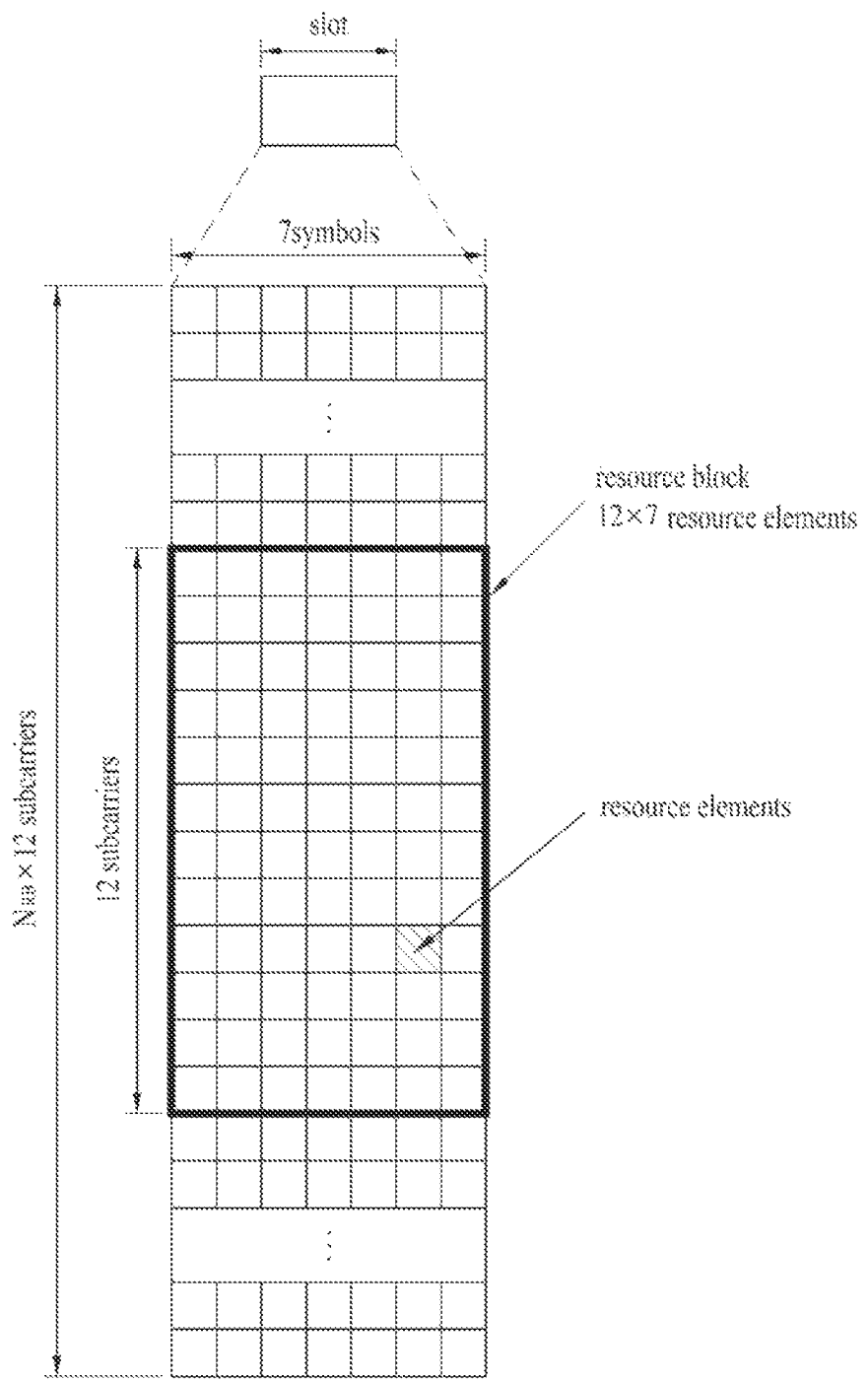
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 4:
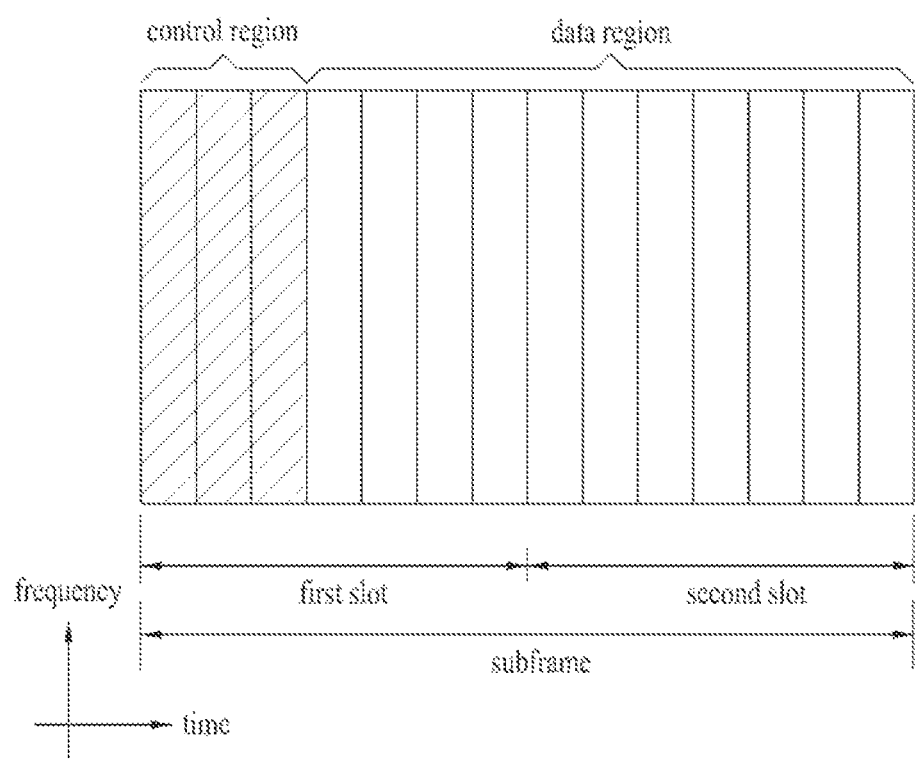
FIG. 4 illustrates a downlink subframe structure.

FIG. 4 illustrates a downlink subframe structure.

Referring to FIG. 4, a maximum of 3(4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE(-A) include a physical control format indicator channel (PCFICH), a physical downlink control channel (PDCCH), a physical hybrid ARQ indicator channel (PHICH), etc.

The PCFICH is transmitted at a first OFDM symbol of a subframe and carries information regarding the number of OFDM symbols used for transmission of control channels within the subframe. The PCIFCH is composed of 4 resource element groups (REGs) which are uniformly distributed in a control region. The PCFICH indicates values of 1 to 3 (or 2 to 4) and is modulated according to quadrature phase shift keying (QPSK). The PHICH is a response of uplink transmission and carries an HARQ ACK/NACK signal. The PHICH is allocated to REGs other than REGs corresponding to a cell-specific reference signal (CRS) and PCFICH in one or more OFDM symbols set according to PHICH duration. The PHICH is allocated to 3 REGs distributed in the frequency domain.

The PDCCH is allocated to first n OFDM symbols (a control region) of a subframe. Here, n is an integer greater than or equal to 1 and is indicated by the PCFICH. Control information transmitted on the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, then a unique identifier (e.g., cell-RNTI (C-RNTI)) of the UE may be masked to the CRC. Alternatively, if the PDCCH is for a paging message, then a paging identifier (e.g., paging-RNTI (P-RNTI)) may be masked to the CRC. If the PDCCH is for system information (more specifically, a system information block (SIB)), then a system information RNTI (SI-RNTI) may be masked to the CRC. When the PDCCH is for a random access response, a random access-RNTI (RA-RNTI) may be masked to the CRC.

A plurality of PDCCHs may be transmitted in one subframe. Each PDCCH is transmitted using one or more control channel elements (CCEs) and each CCE is composed of 9 REGs. One REG corresponds to 4 REs. The CCE is a logical allocation unit used to provide a coding rate based on radio channel state to a PDCCH. A PDCCH format and the number of PDCCH bits are determined by the number of CCEs.

Table 1 shows the number of CCEs, the number of REGs and the number of PDCCH bits according to PDCCH format.

TABLE 1

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE(-A) defines CCE positions in a limited set in which PDCCHs can be positioned for each UE. CCE positions in a limited set that the UE needs to monitor in order to detect the PDCCH allocated thereto may be referred to as 'search space (SS)'. Here, monitoring includes decoding each PDCCH candidate (blind decoding). A UE-specific search space (USS) and a common search space (CSS) are defined. The USS is set per UE and the CSS is equally set for UEs. The USS and the CSS may overlap. The starting point of the USS is UE-specifically hopped in each subframe. A search space may have a size depending on PDCCH format.

Table 2 shows sizes of the USS and CSS.

TABLE 2

| PDCCH format | Number of CCEs (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (ports) transmission
Transmission mode 8: Double layer transmission (ports 7 and 8) or single-antenna port (port 7 or 8) transmission
Transmission modes 9 and 10: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments
Format 4: Resource grants for PUSCH transmission in a cell set to multi-antenna port transmission mode DCI formats can be classified into a TM-dedicated format and a TM-common format. The TM-dedicated format refers to a DCI format set to only a corresponding TM and the TM-common format refers to a DCI format commonly set to all TMs. For example, DCI format 2B can correspond to the TM-dedicated DCI format in case of TM8, DCI format 2C can correspond to the TM-dedicated DCI format in case of TM9, DCI format 2D can correspond to the TM-dedicated DCI format in case of TM10. DCI format 1A may be the TM-common DCI format.

Figure 5:
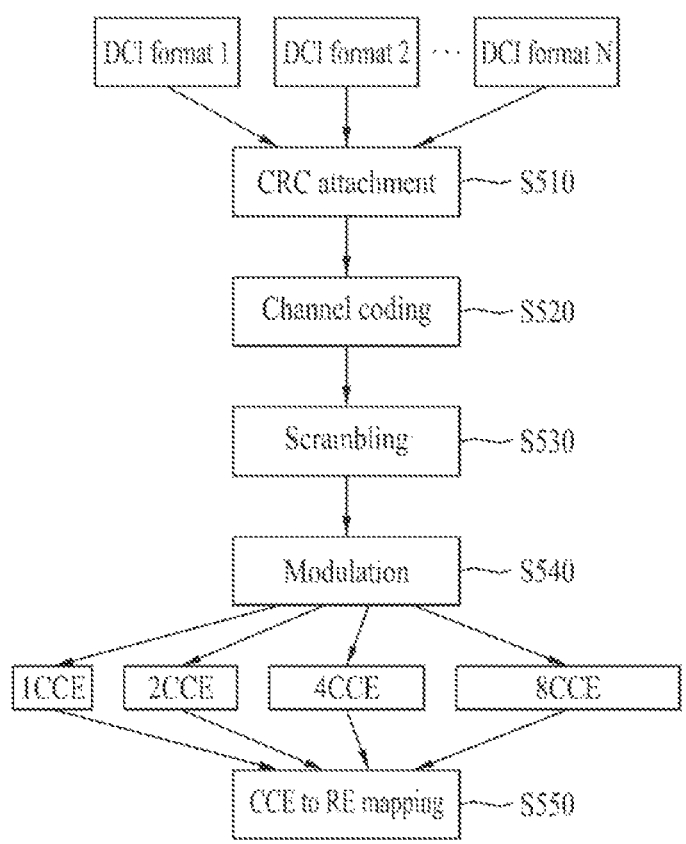
FIG. 5 illustrates an example of configuring a physical downlink control channel (PDCCH) by a transmitter.

FIG. 5 illustrates an example of configuring a PDCCH in a transmitter (e.g. BS).

Referring to FIG. 5, the BS generates control information according to DCI format. The BS may select one of a plurality of DCI formats (DCI formats 1, 2, . . . , N) according to control information to be sent to a UE. A CRC for error detection is attached to the control information generated according to DCI format in step S510. The CRC is masked with an identifier (e.g. radio network temporary identifier (RNTI)) according to the owner or purpose of the PDCCH. In other words, the PDCCH is CRC-scrambled with the identifier (e.g. RNTI).

Table 3 shows examples of the identifier masking the PDCCH.

TABLE 3

| Type | Identifier | Description |
|---|---|---|
| UE-specific | C-RNTI, TC-RNTI, SPS C-RNTI | used for a unique UE identification |
| Common | P-RNTI | used for paging message |
| | SI-RNTI | used for system information |
| | RA-RNTI | used for random access response |

The PDCCH carries control information for a specific UE when C-RNTI, temporary C-RNTI (TC-RNTI) or semi-persistent scheduling C-RNTI (SPS C-RNTI) is used and carries common control information received by all UEs in a cell when other RNTIs are used. Channel coding is performed on the control information having the attached CRC to generate coded control information in step S520. The coded control information may be rate-matched according to allocated CCE aggregation level. The coded control information is scrambled in step S530. Scrambling is applied to multiplexed control information and may be performed as follows.

Coded control information (e.g. coded DCI (including a masked CRC)) to be transmitted on each control channel (i.e. PDCCH) is defined as a bit sequence $b^{(i)}(0), \ldots, b^{(i)}(M_{bit}^{(i)}-1)$. Here, $M_{bit}^{(i)}$ denotes the number of bits transmitted on PDCCH #i of a subframe. In this case, multiplexed control information is given as follows.

$b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$. Here, $n_{PDCCH}$ denotes the number of PDCCHs transmitted in the subframe.

$b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$, is scrambled with a cell-specific sequence to be converted into a scrambled bit sequence $\tilde{b}(0), \ldots, \tilde{b}(M_{tot}-1)$. $M_{tot}$ denotes the bit number (or length) of the multiplexed control information or the bit number (or length) of the scrambled bit sequence.

Scrambling may be performed according to the following equation.

$$\tilde{b}(i) = (b(i) + c(i)) \bmod 2 \qquad \text{[Equation 1]}$$

Here, i=0, 1, ..., $M_{tot}$, mod represents a modulo operation, and scrambling sequence c(i) is obtained using the following equation.

$$c(n)=(x_1(n+N_C)+x_2(n+N_C))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2 \quad \text{[Equation 2]}$$

Here, n=0, 1, ..., $M_{PN}$−1, $M_{PN}$ denotes a sequence length, $N_C$=1600, $x_1(0)$=1, $x_1(n)$=0, n=1, 2, ..., 30 and $c_{init}=\sum_{i=0}^{30}x_2(i)\cdot 2^i$.

$c_{init}$ is an initial value used to generate the scrambling sequence and corresponds to $\lfloor n_s/2 \rfloor 2^9+N_{ID}^{cell}$. Here, $n_s$ is a slot number in a radio frame, $N_{ID}^{cell}$ is a physical cell identifier, and $\lfloor \ \rfloor$ indicates a flooring function. A scrambling sequence generator according to Equation 2 can be initialized to $c_{init}$ per subframe.

The scrambled control information is modulated to generate modulated symbols in step S540. Modulated symbols constituting one PDCCH may have one of CCE aggregation levels of 1, 2, 4 and 8. The modulated symbols are mapped to REs (CCE to RE mapping) in step S550.

Figure 6:
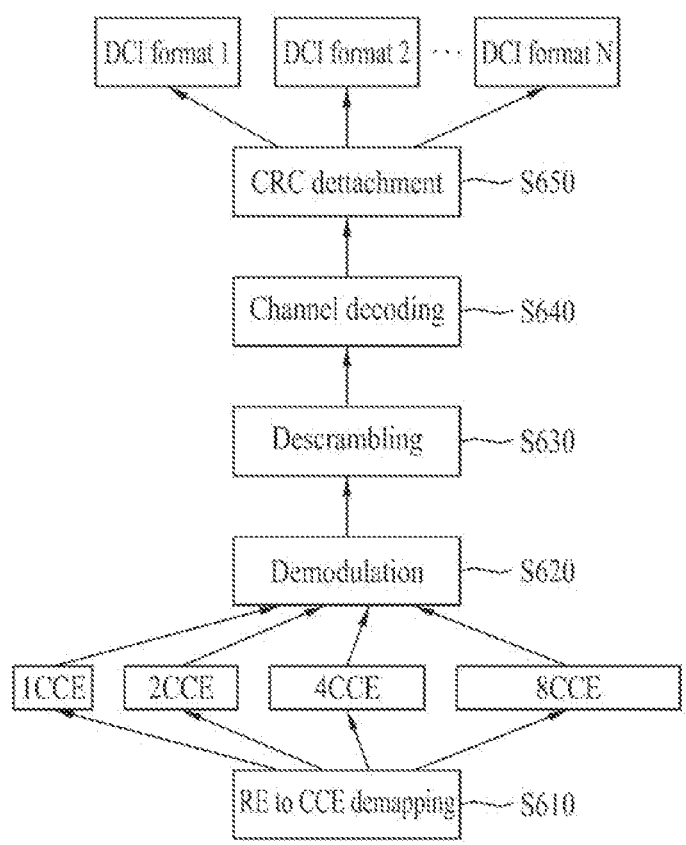
FIG. 6 illustrates an example of processing a PDCCH by a receiver.

FIG. 6 illustrates an example of processing a PDCCH by a receiver (e.g. UE).

Referring to FIG. 6, the UE demaps physical REs to CCEs (CCE to RE demapping) in step S610. Since the UE does not know the CCE aggregation level at which the PDCCH will be received, the UE demodulates control information per CCE aggregation level in S620. The UE may rate-dematch the demodulated control information. In this case, the UE may rate-demathing the demodulated control information per DCI format (or DCI payload size) since the UE does not know the DCI format (or DCI payload size) of control information that the UE needs to receive.

The UE descrambles the demodulated control information $\tilde{b}(i)$ to generate descrambled control information b(i) in step S630. Descrambling may be performed according to the following equation. $\tilde{b}(i)$ and b(i) are as defined above.

$$b(i)=(\tilde{b}(i)+c(i))\mod 2 \quad \text{[Equation 3]}$$

Here, the scrambling sequence c(i) is obtained using Equation 2.

The UE performs channel decoding on the descrambled control information b(i) according to code rate and checks the CRC to detect an error in step S640. For CRC error checking, the UE performs descrambling (or demasking) with an identifier shown in Table 3. When an error is not detected, the UE detects the PDCCH thereof. When an error is detected, the UE continuously performs blind decoding for other CCE aggregation levels or other DCI formats (or DCI payload sizes). Upon detection of the PDCCH thereof, the UE detaches the CRC from the decoded control information to obtain the control information in step S650.

Figure 7:
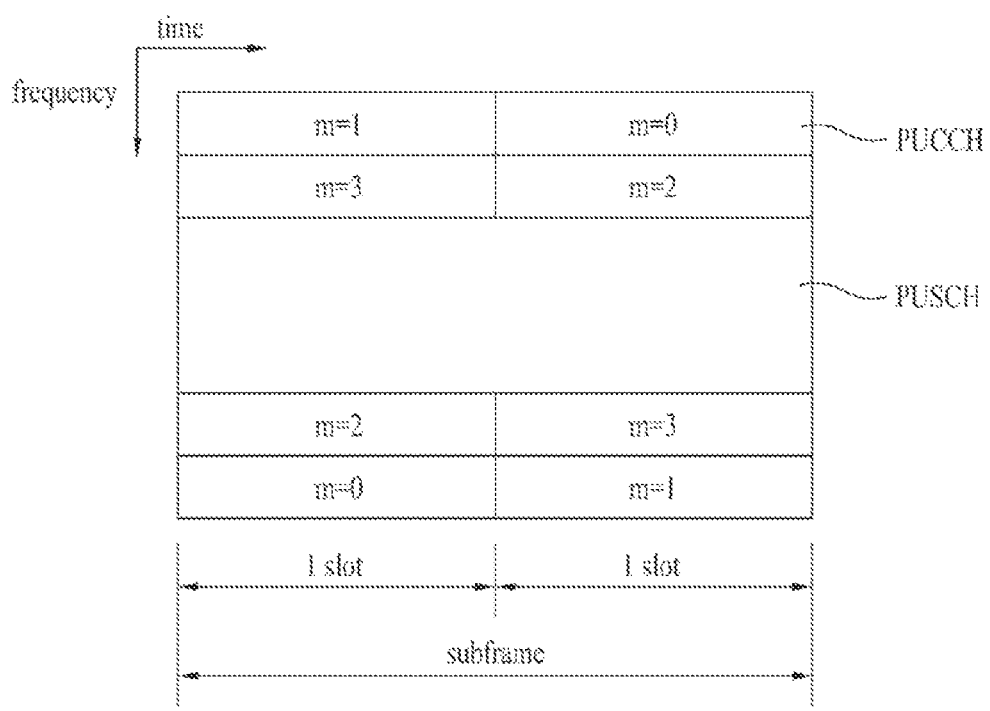
FIG. 7 illustrates an uplink subframe structure.

FIG. 7 illustrates an uplink subframe structure used in LTE.

Referring to FIG. 7, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ ACK/NACK: This is a response signal to a downlink data block (e.g. transport block or codeword) on a PDSCH and indicates whether the downlink data block has been successfully received. A 1-bit ACK/NACK signal is transmitted as a response to a single downlink codeword and a 2-bit ACK/NACK signal is transmitted as a response to two downlink codewords. An HARQ response may be used interchangeably with HARQ ACK/NACK or HARQ-ACK.

CQI (channel quality indicator): This is feedback information about a downlink channel. Feedback information regarding Multiple Input Multiple Output (MIMO) includes RI (rank indicator) and PMI (precoding matrix indicator). 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 4 shows the mapping relationship between PUCCH formats and UCI in LTE.

TABLE 4

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 1 coded bits) |

Figure 8:
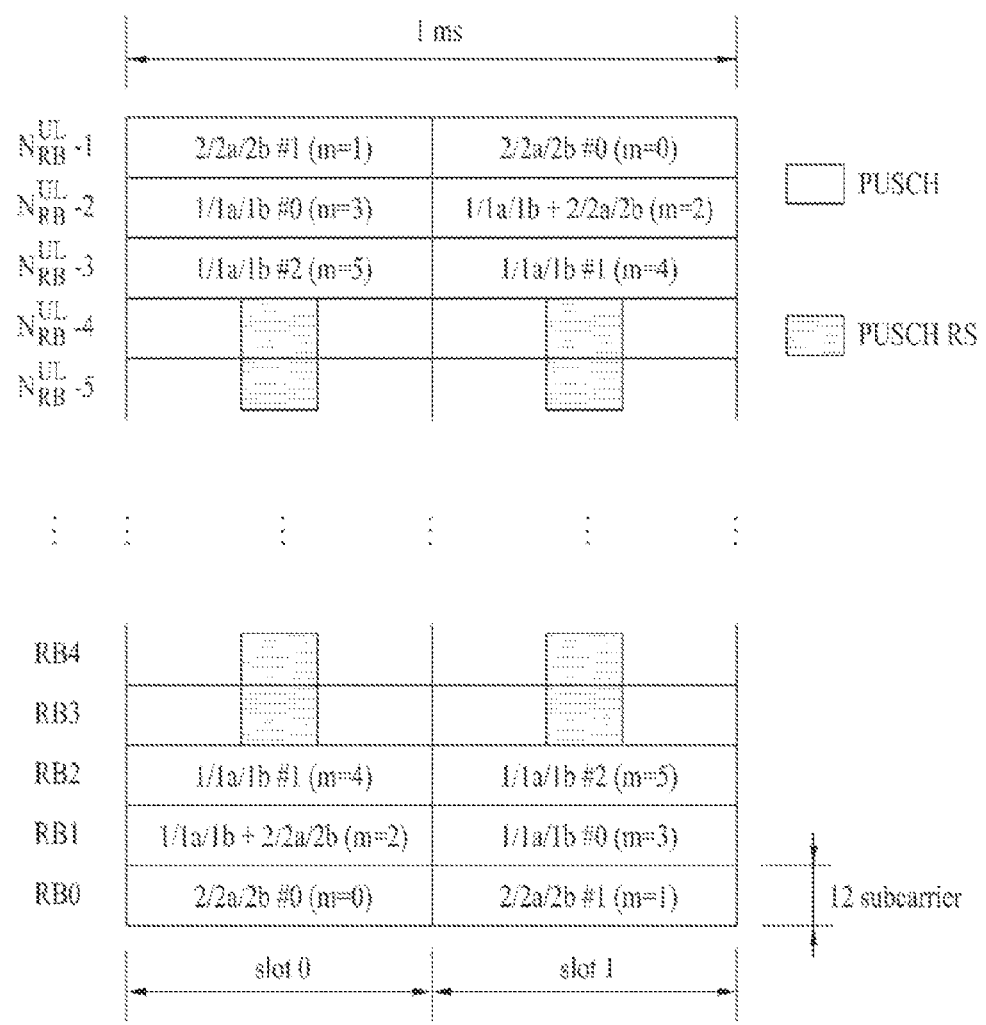
FIG. 8 illustrates an example of physically mapping a PUCCH format to a PUCCH region.

FIG. 8 illustrates an example of physically mapping PUCCH formats to PUCCH regions.

Referring to FIG. 8, the PUCCH formats are mapped to RBs in the order of PUCCH formats 2/2a/2b (CQI) (e.g. PUCCH region m=0, 1), PUCCH formats 2/2a/2b (CQI) or PUCCH formats 1/1a/1b (SR/HARQ ACK/NACK) (e.g. PUCCH region m=2 if present) and PUCCH formats 1/1a/1b (SR/HARQ ACK/NAKC) (e.g. PUCCH region m=3, 4, 5) from the band edge to the inside and transmitted. The number $N_{RB}^{(2)}$ of PUCCH RBs that can be used for PUCCH format 2/2a/2b (CQI) is signaled to the UE through broadcast signaling in the cell.

Figure 9:
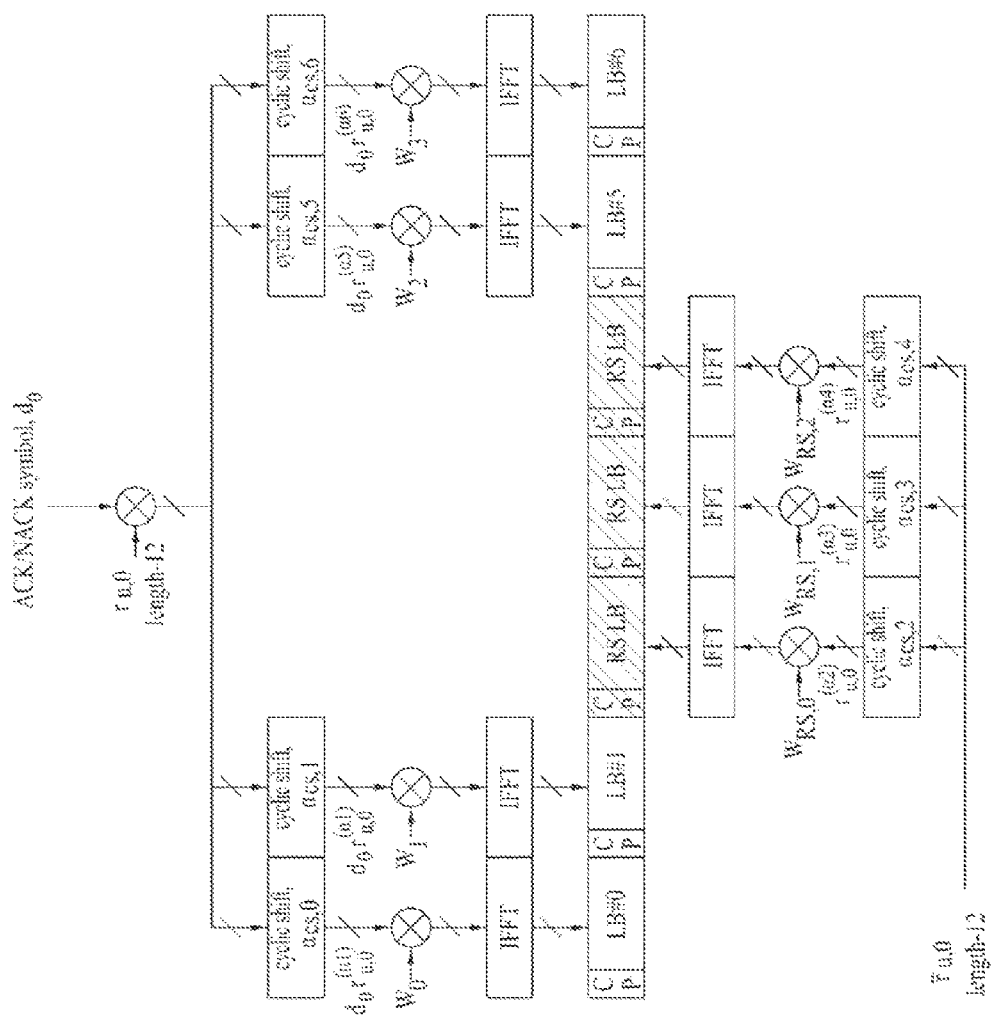
FIG. 9 illustrates PUCCH format 1a/1b slot level structures.

FIG. 9 illustrates slot level structures of PUCCH formats 1a/1b. The PUCCH formats 1a/1b are used for ACK/NACK transmission. In the case of normal CP, SC-FDMA symbols #2, #3 and #4 are used for DMRS transmission. In the case of extended CP, SC-FDMA symbols #2 and #3 are used for DMRS transmission. Accordingly, 4 SC-FDMA symbols in a slot are used for ACK/NACK transmission. PUCCH format 1a/1b is called PUCCH format 1 in the specification for convenience.

Referring to FIG. 9, 1-bit [b(0)] and 2-bit [b(0)b(1)] ACK/NACK information are modulated according to BPSK and QPSK modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). PUCCH formats 1a/1b perform time domain spreading using an orthogonal spreading code $W_0$, $W_1$, $W_2$, $W_3$, (e.g. Walsh-Hadamard or DFT code) in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

Figure 10:
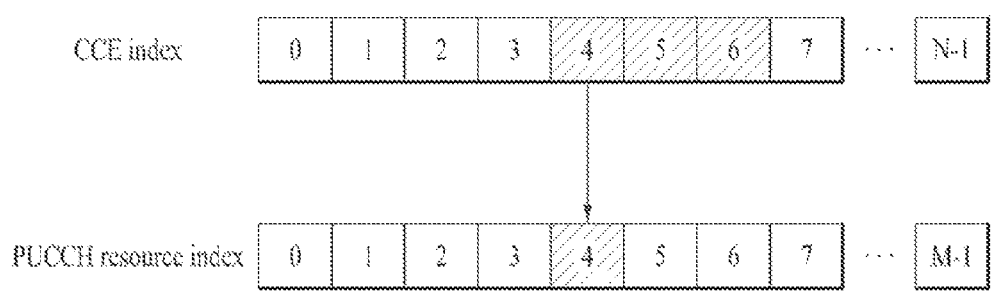
FIG. 10 illustrates determination of a PUCCH resource for ACK/NACK.

FIG. 10 illustrates an example of determining PUCCH resources for ACK/NACK. In LTE, a plurality of PUCCH resources for ACK/NACK are shared by a plurality of UEs in a cell every time the UEs need the PUCCH resources rather than allocated to UEs in advance. Specifically, a PUCCH resource used for a UE to transmit an ACK/NACK signal corresponds to a PDCCH on which scheduling information for corresponding DL data. The region in which the PDCCH is transmitted in a DL subframe is configured with a plurality of control channel elements (CCEs), and a PDCCH transmitted in a DL subframe to a UE is configured with one or more CCEs. The UE transmits ACK/NACK through a PUCCH resource corresponding to a specific one (e.g. first CCE) of the CCEs constituting the PDCCH.

Referring to FIG. 10, each block in a downlink component carrier (DL CC) represents a CCE and each block in an uplink component carrier (UL CC) indicates a PUCCH resource. Each PUCCH index corresponds to a PUCCH resource for ACK/NACK. If information for a PDSCH is delivered on a PDCCH composed of CCEs #4, #5 and #6, as shown in FIG. 10, then a UE transmits an ACK/NACK signal on PUCCH #4 corresponding to CCE #4, the first CCE of the PDCCH. FIG. 10 illustrates a case in which maximum M PUCCHs are present in the UL CC when maximum N CCEs exist in the DL CC. Though N can equal M, N may differ from M and CCEs are mapped to PUCCHs in an overlapped manner.

Specifically, a PUCCH resource index in LTE is determined as follows.

$$n^{(1)}_{PUCCH} = n_{CCE} + N^{(1)}_{PUCCH}$$ [Equation 1]

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal cover code (or orthogonal spreading code) and a PRB (physical resource block) for PUCCH format 1 are obtained from $n^{(1)}_{PUCCH}$.

When an LTE system operates in TDD, a UE transmits a single multiplexed ACK/NACK signal for a plurality of PDSCHs received through different subframes. Specifically, the UE transmits a multiplexed ACK/NACK signal for a plurality of PDSCHs using PUCCH selection. PUCCH selection is referred to as ACK/NACK selection. When the UE receives a plurality of DL data in the PUCCH selection scheme, the UE occupies a plurality of UL physical channels in order to transmit a multiplexed ACK/NACK signal. For example, when the UE receives a plurality of PDSCHs, the UE can occupy the same number of PUCCHs as the PDSCHs using a specific CCE of a PDCCH which indicates each PDSCH. In this case, the UE can transmit a multiplexed ACK/NACK signal using combination of which one of the occupied PUCCHs is selected and modulated/coded results applied to the selected PUCCH.

Table 5 shows a PUCCH selection scheme defined in LTE.

TABLE 5

| HARQ-ACK(0), HARQ-ACK(1), HARQ-ACK(2), HARQ-ACK(3) | Subframe $n^{(1)}_{PUCCH,i}$ | b(0), b(1) |
|---|---|---|
| ACK, ACK, ACK, ACK | $n^{(1)}_{PUCCH,1}$ | 1.1 |
| ACK, ACK, ACK, NACK/DTX | $n^{(1)}_{PUCCH,1}$ | 1.0 |
| NACK/DTX, NACK/DTX, NACK, DTX | $n^{(1)}_{PUCCH,2}$ | 1.1 |
| ACK, ACK, NACK/DTX, ACK | $n^{(1)}_{PUCCH,1}$ | 1.0 |
| NACK, DTX, DTX, DTX | $n^{(1)}_{PUCCH,0}$ | 1.0 |
| ACK, ACK, NACK/DTX, NACK/DTX | $n^{(1)}_{PUCCH,1}$ | 1.0 |
| ACK, NACK/DTX, ACK, ACK | $n^{(1)}_{PUCCH,3}$ | 0.1 |
| NACK/DTX, NACK/DTX, NACK/DTX, NACK | $n^{(1)}_{PUCCH,3}$ | 1.1 |
| ACK, NACK/DTX, ACK, NACK/DTX | $n^{(1)}_{PUCCH,2}$ | 0.1 |
| ACK, NACK/DTX, NACK/DTX, ACK | $n^{(1)}_{PUCCH,0}$ | 0.1 |
| ACK, NACK/DTX, NACK/DTX, NACK/DTX | $n^{(1)}_{PUCCH,0}$ | 1.1 |
| NACK/DTX, ACK, ACK, ACK | $n^{(1)}_{PUCCH,3}$ | 0.1 |
| NACK/DTX, NACK, DTX, DTX | $n^{(1)}_{PUCCH,1}$ | 0.0 |
| NACK/DTX, ACK, ACK, NACK/DTX | $n^{(1)}_{PUCCH,2}$ | 1.0 |
| NACK/DTX, ACK, NACK/DTX, ACK | $n^{(1)}_{PUCCH,3}$ | 1.0 |
| NACK/DTX, ACK, NACK/DTX, NACK/DTX | $n^{(1)}_{PUCCH,1}$ | 0.1 |
| NACK/DTX, NACK/DTX, ACK, ACK | $n^{(1)}_{PUCCH,3}$ | 0.1 |
| NACK/DTX, NACK/DTX, ACK, NACK/DTX | $n^{(1)}_{PUCCH,2}$ | 0.0 |
| NACK/DTX, NACK/DTX, NACK/DTX, ACK | $n^{(1)}_{PUCCH,3}$ | 0.0 |
| DTX, DTX, DTX, DTX | N/A | N/A |

In Table 5, HARQ-ACK(i) indicates the HARQ ACK/NACK/DTX result of an i-th data unit ($0 \leq i \leq 3$). Results of HARQ ACK/NACK/DTX include ACK, NACK, DTX (discontinuous transmission) and NACK/DTX. DTX represents a case in which a data unit corresponding to HARQ-ACK(i) is not present or the UE does not detect the data unit corresponding to HARQ-ACK(i). Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 5, $n^{(1)}_{PUCCH,X}$ represents a PUCCH resource used for ACK/NACK transmission, and b(0)b(1) indicates two bits transmitted through the selected PUCCH resource, which are modulated using QPSK. For example, when the UE has decoded 4 data units successfully, the UE transits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except some cases (NACK/DTX, N/D).

Figure 11:
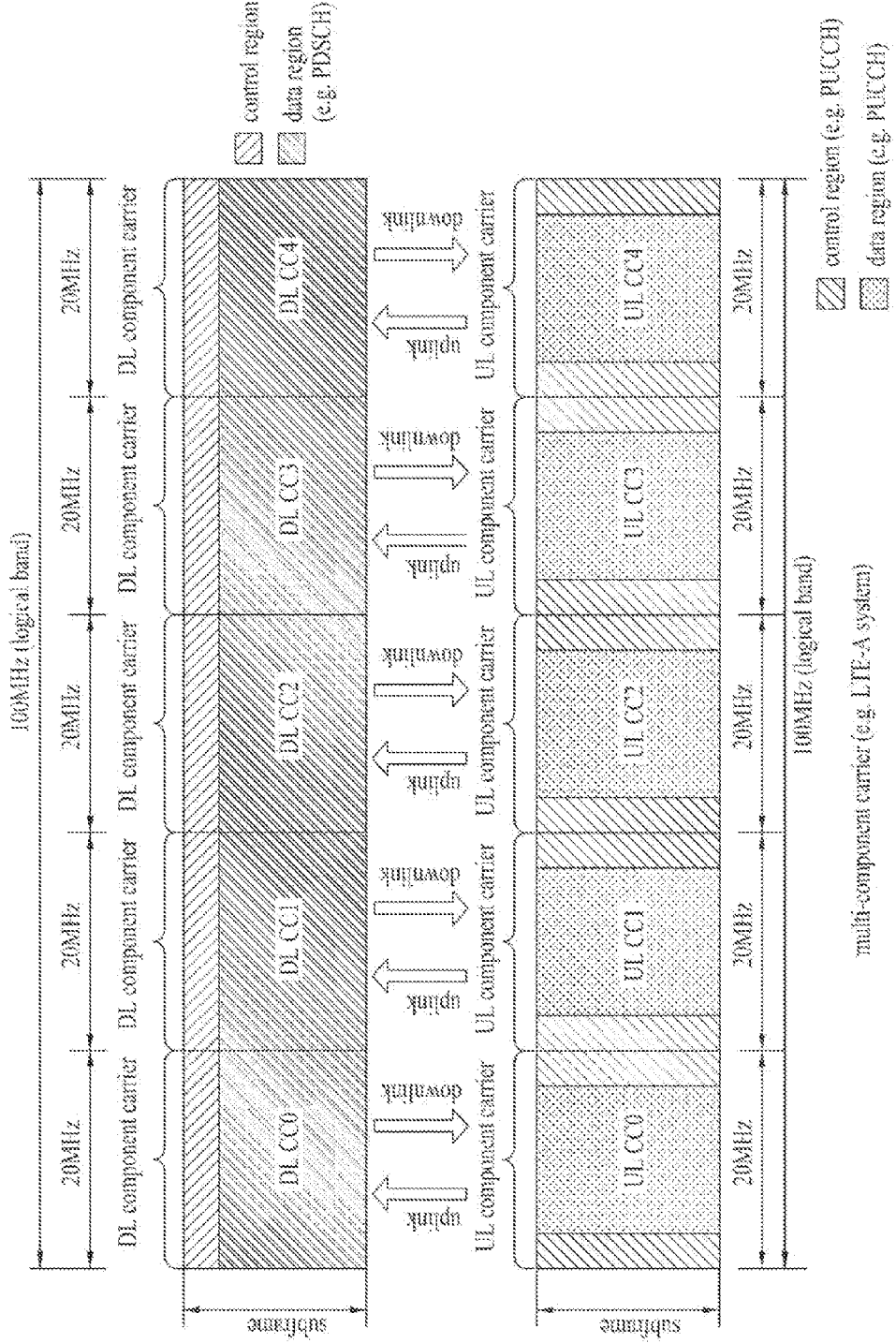
FIG. 11 illustrates a CA (carrier aggregation) communication system.

FIG. 11 illustrates a carrier aggregation (CA) communication system.

Referring to FIG. 11, a plurality of UL/DL component carriers (CCs) can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

- CIF disabled: a PDCCH on a DL CC is used to allocate a PDSCH resource on the same DL CC or a PUSCH resource on a linked UL CC.
- No CIF
- CIF enabled: a PDCCH on a DL CC can be used to allocate a PDSCH or PUSCH resource on a specific DL/UL CC from among a plurality of aggregated DL/UL CCs using the CIF.
  - LTE DCI format extended to have CIF
  - CIF corresponds to a fixed x-bit field (e.g. x=3) (when CIF is set)
  - CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 12:
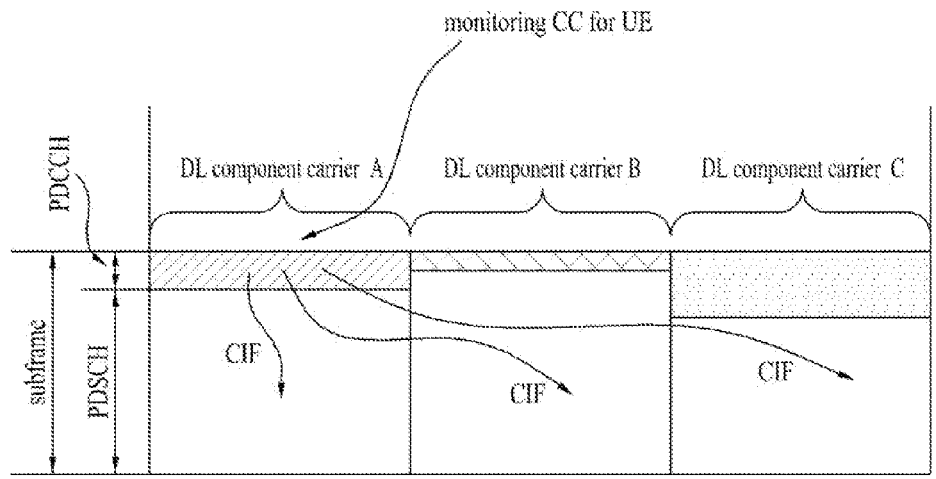
FIG. 12 illustrates cross-carrier scheduling.

FIG. 12 illustrates a case in which 3 DL CCs are aggregated and DL CC A is set to a monitoring DL CC. When the CIF is disabled, each DL CC can transmit only a PDCCH that schedules a PDSCH corresponding to the DL CC without a CIF according to LTE PDCCH rule. When the CIF is enabled through higher layer signaling, only DL CC A can transmit not only the PDCCH of DL CC A but also PDCCHs of other DL CCs using the CIF. A PDCCH is not transmitted on DL CC B and DL CC C which are not set to the monitoring DL CC. Here, the term "monitoring DL CC" may be replaced by the equivalent terms such as "monitoring carrier", "monitoring cell", "scheduling carrier", "scheduling cell", serving carrier, "serving cell", etc. A DL CC on which a PDSCH corresponding to a PDCCH is transmitted and a UL CC on which a PUSCH corresponding to a PUCCH is transmitted may be referred to as a scheduled carrier, a scheduled cell, etc.

In the case of FDD DL carriers and TDD DL subframes, the first n OFDM symbols of each subframe are used for physical channels, PDCCH, PHICH, PCFICH, etc. for control information transmission, and other OFDM symbols are used for PDSCH transmission. The number of symbols used for control channel transmission in each subframe is signaled to the UE dynamically through a physical channel such as a PCFICH or semi-statically through RRC signaling. The value n may be set to 1 to 4 symbols according to subframe characteristics and system characteristics (FDD/TDD, system bandwidth, etc.). The PDCCH used for DL/UL scheduling and control information transmission in LTE is transmitted through limited OFDM symbols. Accordingly, LTE-A introduces an enhanced PDCCH (E-PDCCH) that is flexibly multiplexed with a PDSCH according to FDM.

Figure 13:
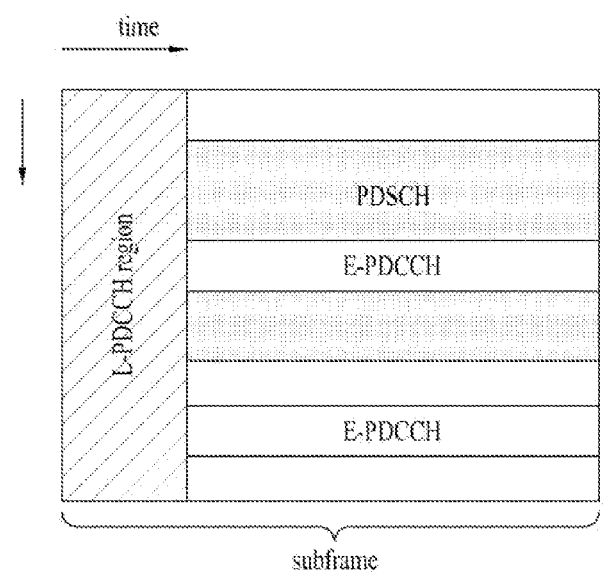
FIG. 13 illustrates an example of allocating an enhanced PDCCH (E-PDCCH) to a data region of a subframe.

FIG. 13 illustrates an example of allocating an E-PDCCH to a subframe.

Referring to FIG. 13, a PDCCH (referred to as a legacy PDCCH (L-PDCCH)) according to LTE(-A) may be allocated to a control region (refer to FIG. 4) of a subframe. In the figure, an L-PDCCH region refers to a region to which the L-PDCCH can be allocated. The L-PDCCH may refer to a control region, a control channel resource region (i.e. CCE resources) to which the PDCCH can be allocated in the control region or a PDCCH search space according to context. A PDCCH may be additionally allocated to a data region (e.g. a resource region for a PDSCH, refer to FIG. 4). The PDCCH allocated to the data region is referred to as an E-PDCCH. As shown in the figure, control channel resources may be additionally secured through the E-PDCCH to mitigate scheduling restriction due to limited control channel resources of the L-PDCCH region. The E-PDCCH and PDSCH are multiplexed according to FDM in the data region.

Specifically, the E-PDCCH may be detected/demodulated on the basis of a demodulation reference signal (DM RS). The E-PDCCH is transmitted over a physical resource block (PRB) pair in the time domain. More specifically, a search space (SS) for E-PDCCH detection may be composed of one or more (e.g. 2) E-PDCCH sets. Each E-PDCCH set may occupy a plurality of (e.g. 2, 4 or 8) PRB pairs. Enhanced CCEs (eCCEs) constituting an E-PDCCH set may be mapped in a localized or distributed manner (according to whether one eCCE is dispersed in a plurality of PRB pairs). When E-PDCCH scheduling is configured, a subframe in which E-PDCCH transmission/detection will be performed may be designated. The E-PDCCH may be configured in a UE-specific search space (USS) only. A UE may attempt DCI detection only for an L-PDCCH CSS and E-PDCCH USS in a subframe (referred to as E-PDCCH subframe hereinafter) configured to permit the E-PDCCH to be transmitted and attempt DCI detection for the L-PDCCH CSS and L-PDCCH USS in a subframe (i.e. non-E-PDCCH subframe) configured not to permit E-PDCCH transmission.

The E-PDCCH carries DCI like the L-PDCCH. For example, the E-PDCCH may carry downlink scheduling information and uplink scheduling information. An E-PDCCH/PDSCH procedure and an E-PDCCH/PUSCH procedure are equal/similar to the procedures described with reference to steps S107 and S108 of FIG. 1. That is, the UE may receive the E-PDCCH and receive data/control information through a PDSCH corresponding to the E-PDCCH. In addition, the UE may receive the E-PDCCH and transmit data/control information through a PUSCH corresponding to the E-PDCCH. Meanwhile, LTE adopts a scheme in which a PDCCH candidate region (referred to as a PDCCH search space) is reserved in a control region and a PDCCH of a specific UE is transmitted in part of the PDCCH search space. Accordingly, the UE may obtain the PDCCH thereof in the PDCCH search space through blind decoding. Similarly, the E-PDCCH may be transmitted over some or all reserved resources.

Figure 14:
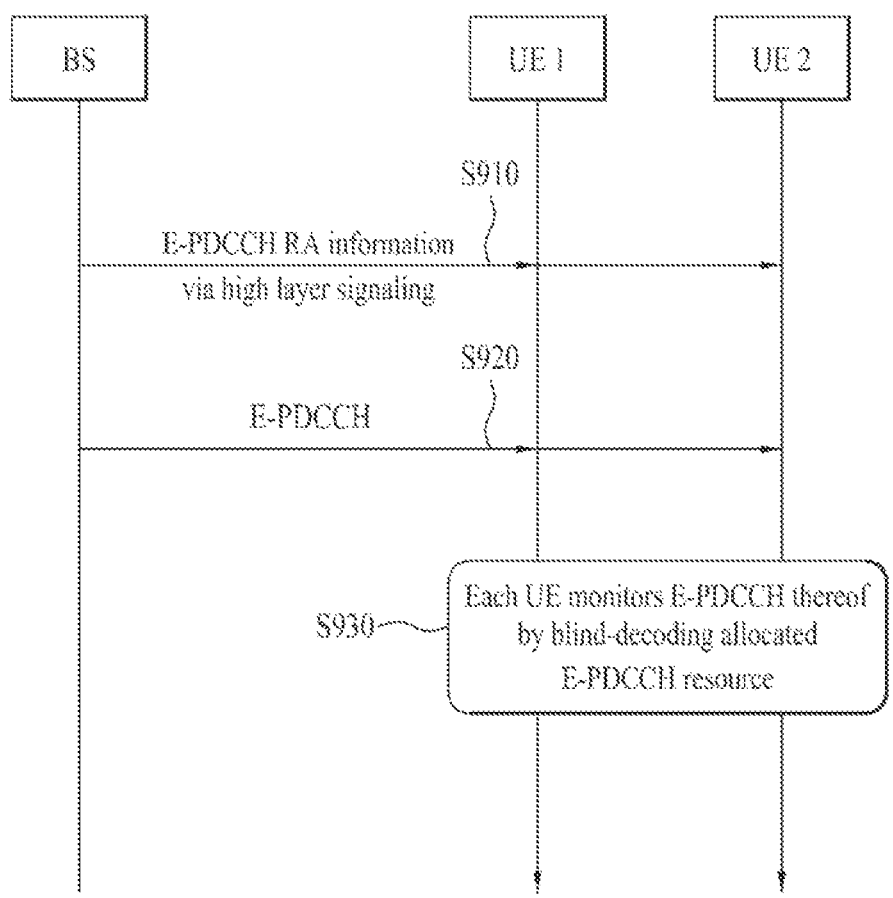
FIG. 14 illustrates a procedure of allocating resources for an E-PDCCH and receiving a PDSCH.

FIG. 14 illustrates a procedure of allocating resources for an E-PDCCH and receiving the E-PDCCH.

Referring to FIG. 14, a BS transmits E-PDCCH resource allocation (RA) information to a UE (S910). The E-PDCCH RA information may include RB (or virtual resource block (VRB)) allocation information. The RB allocation information may be provided on an RB-by-RB basis or RBG-by-RBG basis. An RBG includes two or more consecutive RBs. The E-PDCCH RA information may be transmitted using higher layer (e.g. radio resource control (RRC) layer) signaling. Here, the E-PDCCH RA information is used to reserve E-PDCCH resources (regions) (referred to as an E-PDCCH set hereinafter). The BS transmits the E-PDCCH to the UE (S920). The E-PDCCH may be transmitted in some or all E-PDCCH resources (e.g. M RBs) reserved in step S910. Accordingly, the UE monitors resources (region) (referred to as an E-PDCCH search space hereinafter) in which the E-PDCCH can be transmitted (S930). The E-PDCCH search space may be provided as part of the RB set allocated in step S910. Here, monitoring includes blind decoding of a plurality of E-PDCCH candidates in the search space. Blind decoding may be performed using a scrambling sequence applied to the E-PDCCH.

Figure 15:
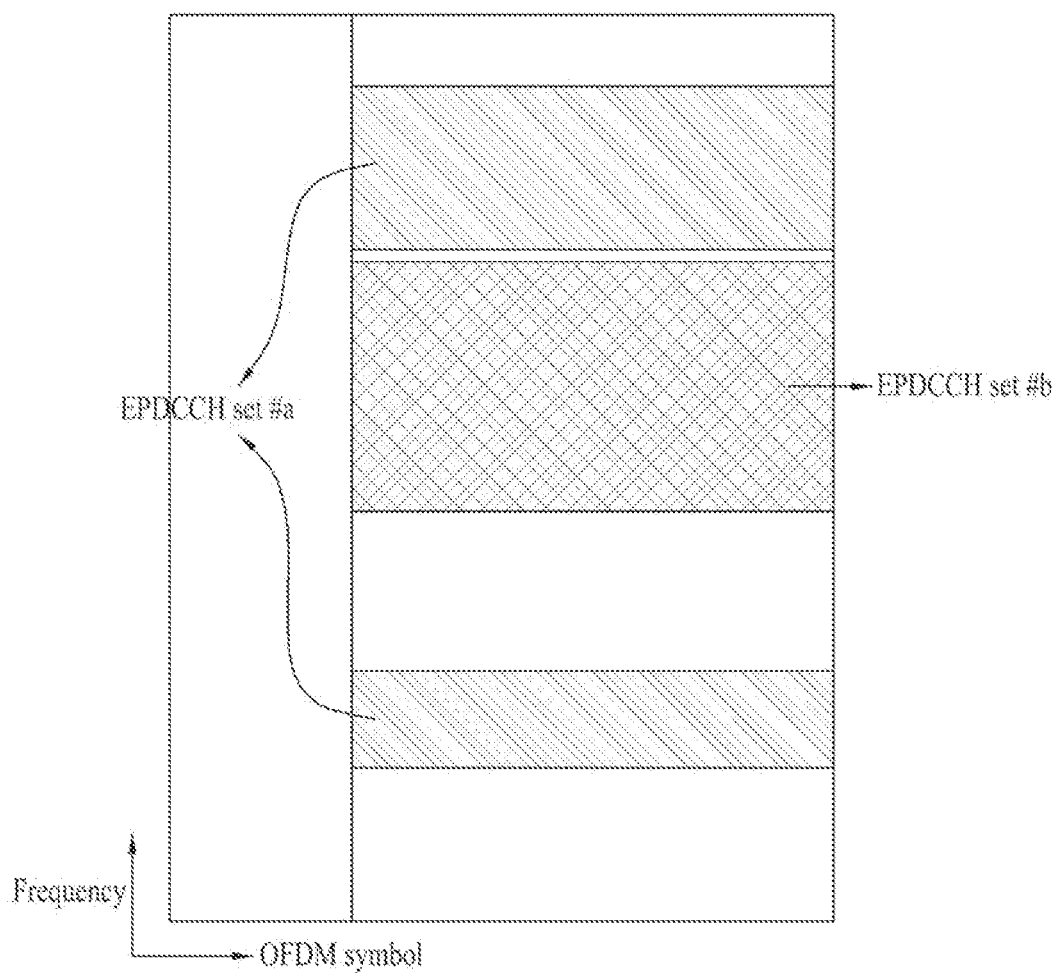
FIG. 15 illustrates an E-PDCCH set.

FIG. 15 illustrates an E-PDCCH set (or E-PDCCH-PRB set).

Referring to FIG. 15, in the case of E-PDCCH, a USS may be composed of K E-PDCCH set(s) per CC/cell for one UE. Here, K may be greater than or equal to 1 and less than or equal to a specific upper limit (e.g. 2). The E-PDCCH set may be composed of N PRB (pairs) (which belong to a PDSCH region). Here, the value N and PRB resources/indices that constitute the E-PDCCH may be independently allocated per E-PDCCH set (i.e. E-PDCCH set-specifically allocated). Accordingly, the number/indices of eCCE resources constituting the E-PDCCH may be (UE-specifically) and E-PDCCH set-specifically configured. For example, eCCEs may be indexed per E-PDCCH set in a subframe (e.g. indexed from 0 per E-PDCCH set). PUCCH resources/indices linked to the eCCE resources/indices may be (UE-specifically and) E-PDCCH set-specifically allocated by setting an independent starting PUCCH resource/index per E-PDCCH set. Here, an eCCE refers to a basic control channel unit (i.e. resource unit) of the E-PDCCH, which is composed of a plurality of REs (belonging to a PRB in a PDSCH region). The eCCE may have a structure depending on E-PDCCH transmission type. For example, an eCCE for localized transmission may be configured using REs belonging to the same PRB pair. An eCCE for distributed transmission may be composed of REs extracted from a plurality of PRB pairs. In the case of localized eCCE, an antenna port (AP) may be used per eCCE resource/index in order to perform optimal beamforming for each UE. In the case of distributed eCCE, the same AP set may be repeatedly used for different eCCEs such that a plurality of UEs can commonly use APs. In the specification, the eCCE may be interpreted as a logical resource unit or a physical resource unit according to context.

Embodiment

PUCCH Resource Allocation when Multiple E-PDCCH Sets are Configured

In the case of L-PDCCH based scheduling, an ACK/NACK feedback transmission resource for DL data scheduled by a DL grant PDCCH is determined as a PUCCH resource linked to a specific CCE index (e.g. lowest CCE index) of a CCE constituting the DL grant PDCCH (refer to Equation 4). In the case of L-PDCCH, CCE resources/indices are cell-specifically configured and cell-specifically linked to different PUCCH resources/indices. Accordingly, CCE resources/indices belonging to a USS for L-PDCCH detection and PUCCH resources/indices linked to the CCE resources/indices can be uniquely discriminated without ambiguity for one UE.

In the case of E-PDCCH based scheduling, an ACK/NACK feedback transmission resource for DL data scheduled by a DL grant E-PDCCH may be determined as a PUCCH resource linked to a specific CCE index (e.g. lowest CCE index) of a CCE constituting the DL grant E-PDCCH or a PUCCH resource linked to a specific eCCE index+offset. The offset may be determined by an ACK/NACK resource indicator (ARI) directly signaled through the DL grant E-PDCCH and/or a dedicated value designated per AP.

Figure 16:
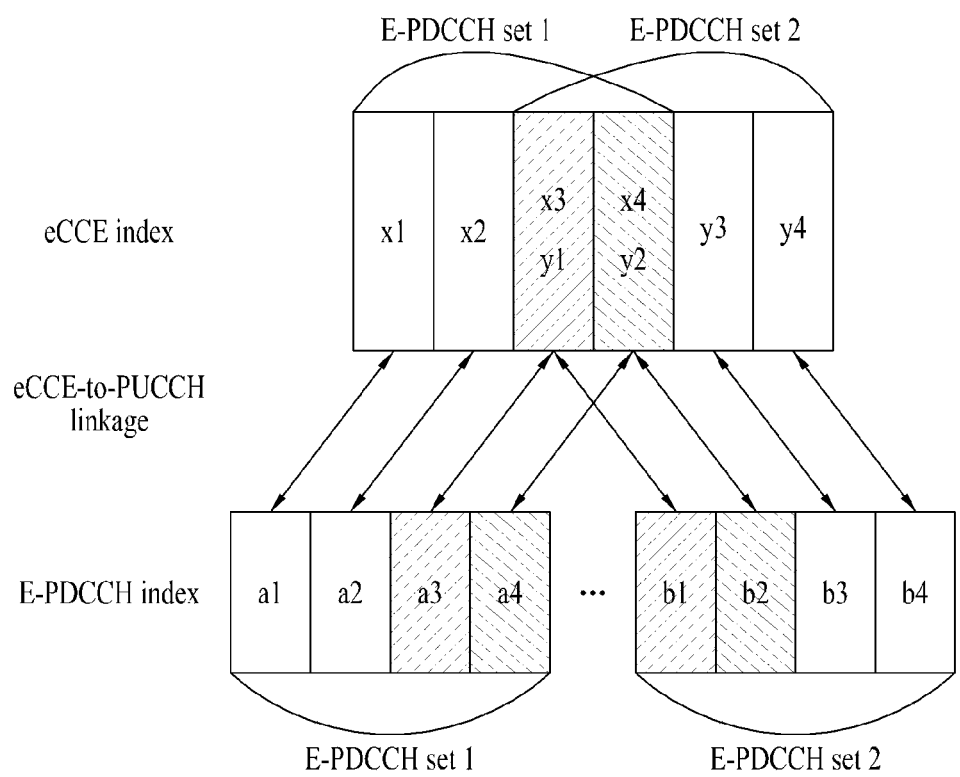
FIG. 16 illustrates a problem generated when PUCCH resources are allocated in E-PDCCH based scheduling.

FIG. 16 illustrates a problem generated when PUCCH resources are allocated during E-PDCCH based scheduling.

Referring to FIG. 16, when a USS is composed of a plurality of E-PDCCH sets, an overlap region may be generated between E-PDCCH sets. Accordingly, (physical) eCCE resources in the overlap region may be mapped to the same/different (logical) eCCE indices belonging to different E-PDCCH sets. For example, E-PDCCH set 1 may include (logical) eCCE indices x1, x2, x3 and x4 which are respectively linked to PUCCH (resource) indices a1, a2, a3 and a4 and E-PDCCH set 2 may include (logical) eCCE indices y1, y2, y3 and y4 which are respectively linked to PUCCH (resource) indices b1, b2, b3 and b4. In addition, (x3, y1) may overlap in the same (physical) eCCE resource and/or (x4, y2) may overlap in the same (physical) eCCE resource in the overlap region of the two E-PDCCH sets. In this situation, an E-PDCCH (e.g. DL grant E-PDCCH) may be detected through the (physical) eCCE resource corresponding to the two (logical) eCCE indices (x3, y1). In this case, there is ambiguity about which one of the PUCCH resources/indices (i.e. a3 and b1) respectively linked with the eCCE indices x3 and y1 will be used to transmit ACK/NACK for DL data scheduled by the E-PDCCH.

That is, when the UE is configured to monitor E-PDCCH candidates in physical resources (e.g. eCCEs or REs) corresponding to x3 and y1 and E-PDCCH candidate x3 and E-PDCCH candidate y1 are mapped to the same physical resource, if the E-PDCCH is detected from the physical resource, then the UE does not know which one of the PUCCH resources/indices respectively linked to the eCCE indices x3 and y1 will be used for ACK/NACK transmission. When E-PDCCH candidates of E-PDCCH set 1 and E-PDCCH candidates of E-PDCCH set 2 do not overlap or only some thereof overlap, an E-PDCCH set corresponding to a detected E-PDCCH can be recognized and thus the PUCCH resource/index linked to x3 or y1 may be used.

The present invention provides a method for determining an ACK/NACK transmission resource (i.e. PUCCH resource/index linked to overlapping eCCE resources) in the overlap region of E-PDCCH sets. Here, overlapping of E-PDCCH sets includes a case in which specific eCCE indices belonging to different E-PDCCH sets overlap with and correspond to the same physical resource (e.g. eCCE, eREG or REs). The method provided by the present invention may be equivalent to a method for determining an E-PDCCH set including an eCCE index or eCCE corresponding to a physical resource (e.g. eCCE, eREG or REs) to which eCCE indices of E-PDCCH sets are overlappingly mapped.

While overlap of E-PDCCH sets for a USS for scheduling with respect to one CC/cell will now be described in the specification for convenience, this is exemplary and the present invention is equally/similarly applicable to not only overlapping of USS E-PDCCH sets for scheduling different CCs/cells but also overlapping of an USS E-PDCCH set and an CSS (cell-specific SS) E-PDCCH set.

When the UE is configured to monitor an E-PDCCH candidate corresponding to x3 of E-PDCCH set 1 and to monitor an E-PDCCH candidate corresponding to y1 of E-PDCCH set 2, x3 and y1 correspond to the same physical resource (e.g. eCCE, eREG or REs) and an E-PDCCH is detected from the physical resource (e.g. eCCE resource) corresponding to (x3, y1) in FIG. 16, methods for determining an E-PDCCH set which includes an eCCE index corresponding to the physical resource (e.g. eCCE resource) will now be described.

Methods 1, 2 and 3 may be considered for flexible PUCCH resource operation/control.

Method 1: The eCCE index corresponding to the physical resource is regarded as an eCCE index belonging to an E-PDCCH set which is composed of the largest number of eCCEs (equivalently, composed of the largest number of PRB pairs).

Method 2: The eCCE index corresponding to the physical resource is regarded as an eCCE index belonging to an E-PDCCH set to which the largest number of blind decoding (BD) operations are allocated.

Method 3: The eCCE index corresponding to the physical resource is regarded as an eCCE index belonging to an E-PDCCH set to which (the largest number of) highest aggregation levels (ALs) is allocated.

In the case of the E-PDCCH set to which the largest number of eCCEs, the largest number of BD operations or (the largest number of) highest ALs are allocated, a relatively large quantity of available PUCCH resources linked to the E-PDCCH may be secured and, simultaneously, the quantity of PUCCH resources used for ACK/NACK transmission may be small compared to the quantity of available PUCCH resources. Accordingly, it is possible to select an eCCE used for DL grant E-PDCCH scheduling and to set an ARI (and/or AP) for ACK/NACK resource determination more flexibly according to methods 1, 2 and 3.

In addition, methods 4 to 7 may be considered for simple implementation with respect to the UE.

Method 4: The eCCE index corresponding to the physical resource is regarded as the index of an eCCE belonging to an E-PDCCH set which has the lowest/highest index for the eCCE.

Method 5: The eCCE index corresponding to the physical resource is regarded as the index of an eCCE belonging to an E-PDCCH set which has the PUCCH index linked to the eCCE index as the lowest/highest index.

Method 6: The eCCE index corresponding to the physical resource is regarded as the index of an eCCE belonging to an E-PDCCH set which has the lowest/highest starting PUCCH index (PUCCH index linked to the first eCCE of the E-PDCCH set).

Method 7: The eCCE index corresponding to the physical resource is regarded as the index of an eCCE belonging to an E-PDCCH set having the lowest/highest index after E-PDCCH set configuration through RRC. The E-PDCCH set index may start with 0.

In the case of methods 1, 2 and 3, when overlapping E-PDCCH sets include the same number of eCCEs (or BD operations or ALs), there may be ambiguity. However, when an overlapping eCCE resource is regarded as an eCCE belonging to an E-PDCCH set having the lowest or highest eCCE index corresponding to the overlapping eCCE resource, the lowest or highest PUCCH index linked thereto, the lowest or highest starting PUCCH index or the lowest or highest E-PDCCH set index according to RRC configuration through methods 4 to 7, simple implementation can be achieved and the ambiguity can be eliminated.

Alternatively, it is possible to consider a method of signaling which E-PDCCH set includes the eCCE (index) corresponding to the physical resource (e.g. eCCE, eREG or REs) (through RRC or PDCCH) in consideration of PUCCH resource operation/control and DL grant E-PDCCH scheduling (eCCE selection and setting of ARI/AP) (method 8). Alternatively, it is possible to consider a method of discriminating DCIs transmitted through different E-PDCCH sets from each other even when E-PDCCH candidates belonging to the different E-PDCCH sets are configured to be mapped to the same physical resource (e.g. eCCE, eREG or REs) by configuring DCI to include an E-PDCCH set index (method 9). For example, when DCI bits are scrambled (refer to Equations 1 and 2), the E-PDCCH set index may be included in the initialization parameter of a scrambling sequence. Alternatively, the DCI payload size of E-PDCCH candidates belonging to different E-PDCCH sets and using overlap eCCE resources may be set to different values to identify through which E-PDCCH set a DL grant is transmitted (method 10). For example, a padding bit may be added for a specific E-PDCCH set only.

Alternatively, a PUCCH resource/index linked to eCCE resources overlapping between E-PDCCH sets may be allocated to only a specific E-PDCCH set among the overlapping E-PDCCH sets (e.g. eCCE-to-PUCCH indexing is performed) and a PUCCH resource/index linked to the overlapping eCCE resources may not be allocated to/defined for the other E-PDCCH set (method 11). For example, eCCE-to-PUCCH indexing for the overlapping eCCE resources may be skipped in the other E-PDCCH set. The specific E-PDCCH set may be determined through methods 1 to 10 or other methods. However, the present invention is not limited thereto. That is, the corresponding overlapping eCCE resource may be regarded as a resource belonging to the specific E-PDCCH set and an ACK/NACK transmission resource for DL data scheduled by a DL grant E-PDCCH detected through the resource may be determined as a PUCCH resource/index linked to an eCCE resource/index included in the specific E-PDCCH set.

Referring to FIG. 16, PUCCH indices allocated to E-PDCCH set 1 may be sequentially allocated to a1, a2, ... from the lowest CCE index (i.e. lowest i in xi) and PUCCH indices corresponding to E-PDCCH set 2 may be sequentially allocated to b1, b2, ... from the lowest eCCE index (i.e. lowest j in yj). In this case, if PUCCH resources/indices linked to the overlap eCCE resources are allocated only to E-PDCCH set 1, then the PUCCH resources/indices are not allocated to y1 and y2 (e.g. PUCCH indexing is skipped) and PUCCH indices b3 and b4 may be respectively allocated to y3 and y4.

In the case of overlapping eCCE resources generated between a CSS and a USS, a specific E-PDCCH (including DL/UL grants) detected/received through the overlap eCCE resource may be regarded/recognized as a DCI format set for the CSS. Accordingly, an ACK/NACK transmission resource for DL data scheduled by a DL grant E-PDCCH detected through the overlap eCCE resource may be determined as a PUCCH resource/index linked to an eCCE resource/index belonging to the CSS. In this case, a PUCCH resource/index linked to the overlap eCCE resource may be allocated only to the CSS (e.g. eCCE-to-PUCCH indexing is performed on the CSS only) and the PUCCH resource/index linked to the overlap eCCE resource may not be allocated to or defined for the USS (method 12). According to method 12, it is possible to solve misalignment between the BS and UE in an RRC reconfiguration period and to improve utilization of PUCCH resources allocated to the CSS in which a relatively small number of available PUCCH resources/indices linked to eCCEs are present.

In addition, in the case of overlap eCCE resource generated between the CSS and USS, an E-PDCCH (including DL/UL grants) detected/received through the overlap eCCE resource may be regarded/recognized as a DCI format set for the USS in order to improve the possibility of use of functions (or functions specialized for the USS) (e.g. aperiodic CSI request and/or aperiodic SRS triggering, etc.) supported by the DCI format configured for the USS. Here, when the CSS and a plurality of USS overlap, methods 1 to 11 or a combination thereof may be applied. Regarding E-PDCCH candidates (belonging to different SSs) corresponding to the specific E-PDCCH detected/received through the overlap eCCE resource, at least one of the DCI (format) payload size, starting eCCE resource, AL (and/or AP) and RNTI used for scrambling may be set to the same value. In this case, a PUCCH resource/index linked to the overlap eCCE may be allocated to a corresponding USS (eCCE-to-PUCCH indexing is performed on the corresponding USS only) and may not be allocated to the CSS (method 13).

Alternatively, in the case of eCCE overlap between the CSS and USS, an available method (e.g. method 12 or method 13) may be determined according to whether the USS (or DCI transmitted through the USS) includes CIF. For example, method 12 is applicable to eCCE overlap between the USS (including the CIF) and CSS whereas method 13 is applicable to eCCE overlap between the USS (including no CIF) and CSS.

Two or more of methods 1 to 13 may be combined. For example, if methods 1 and 5 (or methods 1 and 7) are combined, then the eCCE index mapped to the corresponding physical resource may be regarded as an eCCE (index) belonging to an E-PDCCH set which has the largest number of eCCEs and (when E-PDCCH sets include the same number of eCCEs) has the lowest/highest PUCCH index linked to an overlap eCCE resource while including the largest number of eCCEs or which has the lowest/highest set index used for RRC configuration for the E-PDCCH sets.

An overlapping physical resource (e.g. eCCE, eREG or REs) to which methods 1 to 13 are applied may be limited to a case in which E-PDCCH candidates (belonging to different E-PDCCH sets) that may be mapped to the physical resource have the same attribute. Here, the case in which the E-PDCCH candidates have the same attribute may refer to a case in which each of at least one or all of the DCI (format) payload size, types and sizes of fields constituting DCI, starting eCCE resource, AP, AL, CIF (when cross-CC/cell scheduling is set) and RNTI used for CRC scrambling with respect to the E-PDCCH candidates is set to the same value. For example, in the case of E-PDCCH candidates (belonging to different E-PDCCH sets) including overlapping eCCE resources while one, some or all of the aforementioned attributes thereof are different, an eCCE index (PUCCH resource/index corresponding thereto) belonging to an E-PDCCH set for which attributes used to detect the E-PDCCH candidates are configured is used. In addition, when E-PDCCH candidates belonging to different E-PDCCH sets (e.g. different USSs, or a CSS and a specific USS) include eCCE resources overlapping between the E-PDCCH sets while each of some or all of the aforementioned attributes (e.g. DCI (field) size, starting eCCE resource, AP, AL, RNTI for scrambling) is set to the same value, the UE may not attempt to detect/receive the E-PDCCH candidates (method 14). Here, the different E-PDCCH sets to which the E-PDCCH candidates belong may have the same E-PDCCH transmission type and/or the same DM RS scrambling sequence (e.g. the same scrambling sequence initialization value). Alternatively, an overlapping physical resource (e.g. eCCE, eREG or REs) to which methods 1 to 13 are applied may be restrictedly used even when E-PDCCH candidates (belonging to different E-PDCCH sets) which may be mapped to the physical resource do not have the same attributes. For example, E-PDCCH candidates belonging to E-PDCCH set 1 and E-PDCCH candidates belonging to E-PDCCH set 2 may not have the same RNTI. In this case, the UE can be aware of an E-PDCCH to which a detected E-PDCCH belongs. However, it is possible to use a PUCCH resource linked to a different E-PDCCH set instead of a PUCCH resource linked to the E-PDCCH set including the E-PDCCH detected through methods 1 to 13 for PUCCH resource control.

In addition, the UE may not attempt DCI detection/reception with respect to E-PDCCH candidates belonging to different E-PDCCH sets configured in a PCell (or a cell designated/configured to perform PUCCH based ACK/NACK transmission) only in a case in which the E-PDCCH candidates include eCCE resources overlapping between the E-PDCCH sets and/or a case in which each of some or all of the aforementioned attributes is set to the same value for the E-PDCCH candidates and/or a case in which the same DM RS scrambling sequence and/or the same E-PDCCH transmission type are set for the E-PDCCH sets. Otherwise, the UE may operate on the assumption that DCI is not detected/received through the E-PDCCH candidates.

Cells are limited to the PCell because ambiguity about an ACK/NACK transmission resource (i.e. an implicit PUCCH resource linked to an eCCE resource/index (refer to Equation 4)) between E-PDCCH sets can be limited to a problem of only E-PDCCH sets configured in the PCell, that is, a cell in which (implicit) PUCCH based ACK/NACK transmission is performed. Accordingly, UL grant DCI may be excluded from targets to which the aforementioned DCI related restriction/operation is applied. That is, the above-described DCI related restriction/operation is applicable to DL grant DCI only. Accordingly, normal DCI detection/reception may be performed without restriction on E-PDCCH candidates (including overlap eCCE resources) which have the aforementioned attributes/conditions and belong to different E-PDCCH sets configured in an SCell (or a cell which is not configured to perform (implicit) PUCCH based ACK/NACK transmission).

In addition, in the case of E-PDCCH candidates which has aforementioned attribute/condition (including overlapping eCCE resources) and belong to different E-PDCCH sets, the UE may not attempt DCI detection/reception that causes allocation of implicit PUCCH resources (linked to eCCE resources/indices) for the E-PDCCH candidates. Also, the UE may operate on the assumption that DCI that causes implicit PUCCH resource allocation is not detected/received through the E-PDCCH candidates. In other words, the UE may attempt to detect/receive only DCI that does not cause implicit PUCCH resource allocation for the E-PDCCH candidates (or the UE may operate on the assumption that DCI that does not cause implicit PUCCH resource allocation can be detected/received through the E-PDCCH candidates).

Here, DCI that causes implicit PUCCH resource allocation may be all kinds of DL grant DCI when a HARQ-ACK bundling mode or channel selection mode is configured for ACK/NACK transmission, and may be limited to DL grant DCI that schedules a PCell when PUCCH format 3 mode is configured for ACK/NACK transmission, may be limited to DL grant DCI that schedules the PCell in case of FDD or may be limited to DL grant DCI scheduling the PCell and corresponding to DAI initial value (e.g. 1) in case of TDD. DCI that does not cause implicit PUCCH resource allocation may include DL grant DCI that schedules SCells (in addition to UL grant DCI) when PUCCH format 3 mode is configured for ACK/NACK transmission and further include DL grant DCI that does not correspond to the DAI initial value (e.g. 1) while scheduling the PCell when PUCCH format 3 mode is configured for ACK/NACK transmission in TDD.

Figure 17:
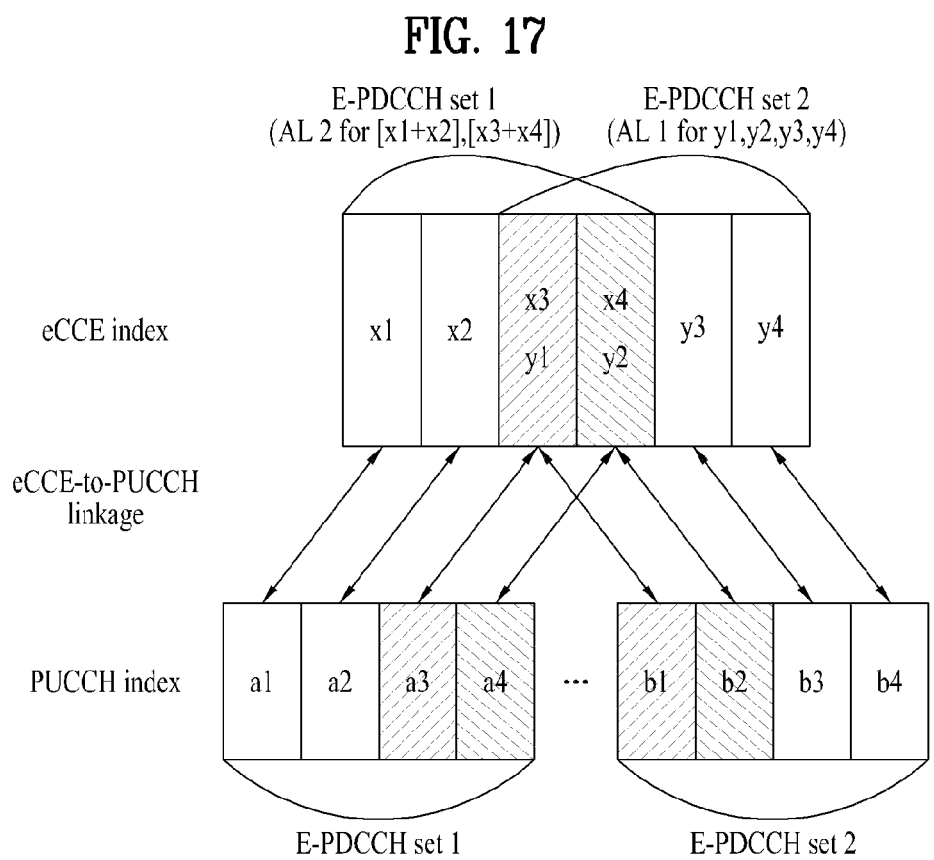
FIG. 17 illustrates PUCCH resource allocation when a plurality of E-PDCCH sets is configured.

FIG. 17 illustrates PUCCH resource allocation when a plurality of E-PDCCH sets is configured.

Referring to FIG. 17, when E-PDCCH set 1 includes eCCE indices x1, x2, x3 and x4 (respectively linked to PUCCH indices a1, a2, a3 and a4) and E-PDCCH set 2 includes eCCE indices y1, y2, y3 and y4 (respectively linked to PUCCH indices b1, b2, b3 and b4), a case in which E-PDCCH candidates with an AL of 2 are set for (x1, x2) and (x3, x4) and E-PDCCH candidates with an AL of 1 are set for y1, y2, y3 and y4 may be considered. Here, when each of (x3, y1) and (x4, y2) is mapped to the same eCCE resource in the overlapping region of the two E-PDCCH sets, AL-2 E-PDCCH candidates (x3, x4) in E-PDCCH set 1 and AL-1 E-PDCCH candidate y1 in E-PDCCH set 2 may occupy the same starting eCCE resource (based on different ALs). In this case, when a PDCCH candidate is detected by assuming AL 2 for the overlapping eCCE resources (x3, x4), eCCE index x3 (PUCCH index a3 linked thereto) in E-PDCCH set 1 may be used to determine an ACK/NACK resource for corresponding DL data. When a PDCCH candidate is detected by assuming AL 1 for the overlap eCCE resource y1, eCCE index y1 (PUCCH index b1 linked thereto) in E-PDCCH set 2 may be used to determine the ACK/NACK resource for the corresponding DL data. That is, a case to which the present invention is applied may be limited to a case in which E-PDCCH candidates related to overlapping eCCEs have the same AL (i.e. the E-PDCCH candidates are mapped to the same physical resource) (refer to Table 1). In addition, AL-1 PDCCH candidate y2 in E-PDCCH set 2 has an AL and a starting eCCE resource different from those of AL-2 PDCCH candidates (x3, x4) in E-PDCCH set 1, and thus an E-PDCCH candidate may be detected by assuming AL 1 for y2, and eCCE index y2 (PUCCH index b2 linked thereto) in E-PDCCH set 2 may be used to determine an ACK/NACK resource corresponding to the E-PDCCH candidate. That is, when E-PDCCH candidates of E-PDCCH set 1 and E-PDCCH candidates of E-PDCCH set 2 are configured to be mapped to the same physical resource (i.e. the same AL) and an E-PDCCH is detected through the physical resource, the UE cannot recognize the E-PDCCH set to which the detected E-PDCCH belongs. However, when physical resources, to which the E-PDCCH candidates of E-PDCCH set 1 and the E-PDCCH candidates of E-PDCCH set 2 are mapped, are partially overlapped (i.e. in case of different ALs), the UE can recognize the E-PDCCH set to which the detected E-PDCCH belongs.

Furthermore, it may be recognized that ambiguity about PUCCH resource/index determination due to overlap of E-PDCCH sets is generated only when related parameters of the E-PDCCH sets are identical to each other. Examples of the parameters include a parameter indicating whether E-PDCCH transmission type is localized or distributed. Accordingly, when the E-PDCCH sets have different E-PDCCH transmission types even if the E-PDCCH sets overlap in a PRB region, PRB pairs to which REs constituting eCCEs belong are different. Accordingly, ambiguity about PUCCH resource/index determination due to overlap may not occur. Examples of the parameters include an E-PDCCH DM RS scrambling parameter. Since the E-PDCCH sets will use different DM RS sequences even in the same eCCE resource if the DM RS scrambling parameter (e.g. scrambling sequence initialization value) of the E-PDCCH sets is set to different values, the UE may identify the E-PDCCH set including an overlap eCCE through the DM RS sequence scrambling parameter used to demodulate the overlap eCCE (the same sequence as the sequence used for DM RS scrambling is used to scramble DCI in the E-PDCCH set). Examples of the parameters further include quasi co-location (QC) information/parameter. When QC cannot be assumed for the two E-PDCCH sets or different QC information/parameters are set therefor, the two E-PDCCH sets will use different assumptions/information/parameters even in the same eCCE resource, and thus the UE may identify the E-PDCCH set including an overlap eCCE through the corresponding assumption/information/parameter used to demodulate the eCCE. Accordingly, overlap of E-PDCCH sets may be limited to a case in which the UE cannot identify the E-PDCCH set including a specific eCCE since PRB pairs constituting two E-PDCCH sets overlap and, at the same time, the same related parameter is set for the E-PDCCH sets in the present invention.

Figure 18:
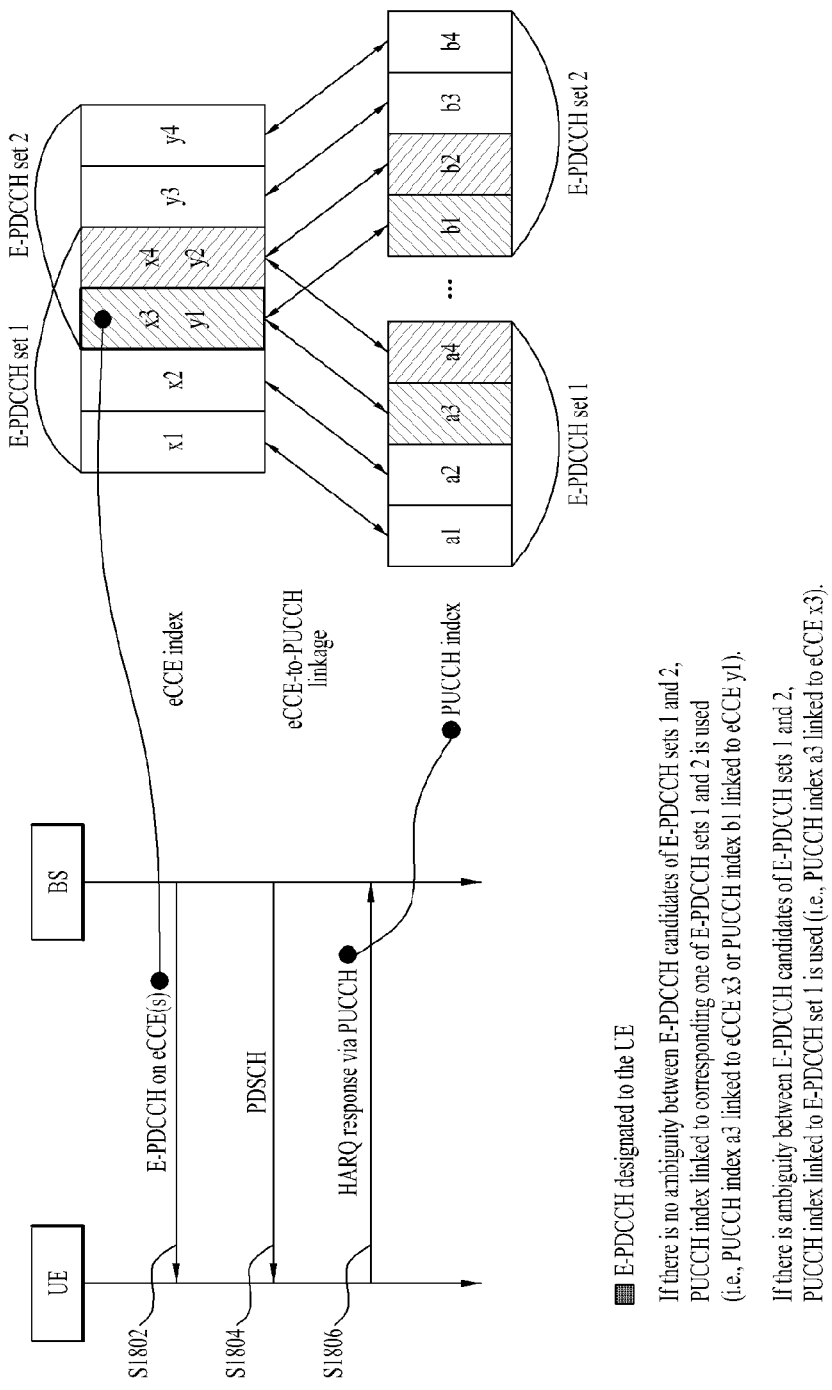
FIG. 18 illustrates an example of allocating PUCCH resources when a plurality of E-PDCCH sets is configured according to the present invention.

FIG. 18 illustrates PUCCH resource allocation and HARQ response transmission according to the present invention.

Referring to FIG. 18, a plurality of E-PDCCH sets (e.g. E-PDCCH sets 1 and 2) is configured for a UE. Each E-PDCCH set includes a plurality of eCCEs which are indexed per E-PDCCH. Specifically, E-PDCCH set 1 may include (logical) eCCE indices x1, x2, x3 and x4 which are respectively linked to PUCCH (resource) indices a1, a2, a3 and a4 and E-PDCCH set 2 may include (logical) eCCE indices y1, y2, y3 and y4 which are respectively linked to PUCCH (resource) indices b1, b2, b3 and b4. In addition, (x3, y1) may overlap and be mapped to the same (physical) eCCE resource and/or (x4, y2) may overlap and be mapped to the same (physical) eCCE resource in the overlap region of the two E-PDCCH sets.

In this situation, the BS may transmit an E-PDCCH on the (physical) eCCE resource corresponding to two (logical) eCCE indices (x3, y1) to the UE (S1802). When the UE is configured to transmit an implicit PUCCH based HARQ response, the UE may transmit the HARQ response to the BS using a PUCCH resource corresponding to the index of the first eCCE among one or more eCCEs constituting the E-PDCCH (S1806). When the E-PDCCH indicates semi-persistent scheduling (SPS) release, the HARQ response may include acknowledgement information for the E-PDCCH. When the E-PDCCH indicates a DL grant with respect to a PDSCH, the BS may additionally transmit the PDSCH to the UE (S1804). In this case, the HARQ response may include acknowledgement information for the PDSCH.

When the UE can recognize the E-PDCCH set including the eCCE index corresponding to the physical resource (e.g. eCCE) to which the E-PDCCH is mapped (that is, when there is no ambiguity between E-PDCCH candidates of E-PDCCH sets 1 and 2), the UE may transmit the HARQ response using a PUCCH resource corresponding to the eCCE. That is, the UE may use PUCCH resource a3 corresponding to eCCE index x3 when the detected E-PDCCH belongs to E-PDCCH set 1 and use PUCCH resource b1 corresponding to eCCE index y1 when the detected E-PDCCH belongs to E-PDCCH set 2. The UE may not recognize the E-PDCCH set including the eCCE index corresponding to the physical resource (e.g. eCCE) to which the E-PDCCH is mapped. That is, there may be ambiguity between E-PDCCH candidates of E-PDCCH sets 1 and 2. In this case, the UE may perform various operations according to the aforementioned methods. For example, if the UE does not know the E-PDCCH including the eCCE index corresponding to the detected E-PDCCH, then the detected E-PDCCH may be considered to correspond to an eCCE index of an E-PDCCH set having the lowest index and a PUCCH resource may be determined (method 7).

Cases in which there is ambiguity between E-PDCCH candidates of the E-PDCCH sets are not limited to the above cases and include cases that satisfy the following conditions i), ii) and iii).

i) A plurality of E-PDCCH sets is scrambled with the same sequence.

ii) The UE is configured to monitor E-PDCCH candidates having the same attribute as the E-PDCCH signal (S1802) in the plurality of E-PDCCH sets. Here, the same attribute includes the same DCI (format) payload size, for example. The same attribute may further include the same RNTI (i.e. RNTI used for CRC scrambling). When E-PDCCH sets are configured only in a USS, E-PDCCH candidates may have C-RNTI or SPS C-RNTI. It is possible to control PUCCH resource allocation using a PUCCH resource linked to an E-PDCCH set other than the E-PDCCH set to which the detected E-PDCCH belongs, rather than a PUCCH resource linked to the E-PDCCH set including the detected E-PDCCH by excluding the RNTI from the same attributes according to implementation scheme.

iii) A plurality of E-PDCCH candidates corresponding to the E-PDCCH signal (S1802) in the plurality of E-PDCCH sets is mapped to the same physical resource.

The aforementioned ambiguity about PUCCH resource/index determination may be prevented by pre-setting appropriate E-PDCCH sets. For example, when two E-PDCCH sets are configured to overlap in a PRB domain, the BS may prevent the UE from operating to prepare for the ambiguity by setting different E-PDCCH transmission types or DM RS scrambling sequences for the two E-PDCCH sets. When the ambiguity problem is solved by the operation of the BS, the UE may be implemented on the assumption that two E-PDCCH sets having the same E-PDCCH transmission type and the same DM RS scrambling sequence are not configured to overlap in a PRB domain.

In addition, the ambiguity about PUCCH resource/index determination may be solved by operation of the BS to attempt to detect all PUCCH resources linked to the two E-PDCCH sets. In this case, the UE may select one of two linked PUCCH resources and transmit an ACK/NACK signal through the selected PUCCH resource on the assumption that overlap eCCEs belong to any of the two E-PDCCH sets. If the UE can simultaneously transmit the two PUCCH resources, then the ACK/NACK may be transmitted through the two PUCCH resources. Here, operation of transmitting no ACK/NACK signal through any of the two PUCCH resources due to ambiguity caused by overlap needs to be excluded. In other words, if the UE needs to receive a DL grant through an eCCE belonging to one of the two E-PDCCH sets, which cannot be identified by the UE, the ACK/NACK signal needs to be transmitted through at least one of the two linked PUCCH resources.

To reduce DCI overhead due to CIF bit addition when cross-CC/cell scheduling is set, a CIF bit may be added only to E-PDCCH candidates using eCCE resources overlapping between E-PDCCHs for scheduling of different CCs/cells and a CIF bit may not be added to the remaining E-PDCCH candidates.

A description will be given of PUCCH resource allocation in case of TDD operation. In TDD, ACK/NACK for one or more DL SFs (i.e. DL data scheduled/transmitted through DL SFs) is fed back through a single UL SF. In case of L-PDCCH based scheduling in TDD, PUCCH resources/indices linked to CCE resources/indices corresponding to L-PDCCH(s) in DL SFs are sequentially stacked in a corresponding UL SF region in the order of DL SFs (PUCCH stacking). For example, when DL SFs #1, #2 and #3 correspond to UL SF #1, PUCCH resources/indices linked to CCE resources/indices used in DL SFs #1, #2 and #3 may be sequentially stacked in the frequency region of UL SF #1 from the edge of the frequency region to the inside of the corresponding bandwidth (BW). In this manner, PUCCH allocation in inner part of the UL bandwidth may be avoided as long as possible to provide flexibility and degree of freedom in UL data scheduling.

When E-PDCCH based scheduling is performed in TDD, similarly to the existing scheme, a structure in which PUCCH resources/indices linked to CCE resources/indices corresponding to an E-PDCCH in DL SFs are sequentially stacked in a corresponding UL SF region (e.g. from the edge of the corresponding BW to the inside thereof) in the order of DL SFs may be considered. To achieve this, an SF offset for PUCCH stacking may be applied to E-PDCCH sets corresponding to each DL SF. The SF offset refers to a stacking unit applied to each E-PDCCH set. PUCCH stacking may be performed per DL SF or E-PDCCH set. Specifically, the SF offset may be determined as the total number of eCCEs (or a specific value calculated based on the same) belonging to all E-PDCCH sets in each DL SF (option-1) or the total number of eCCEs (or a specific value calculated based on the same) belonging to each E-PDCCH set in each DL SF (option-2).

Figure 19:
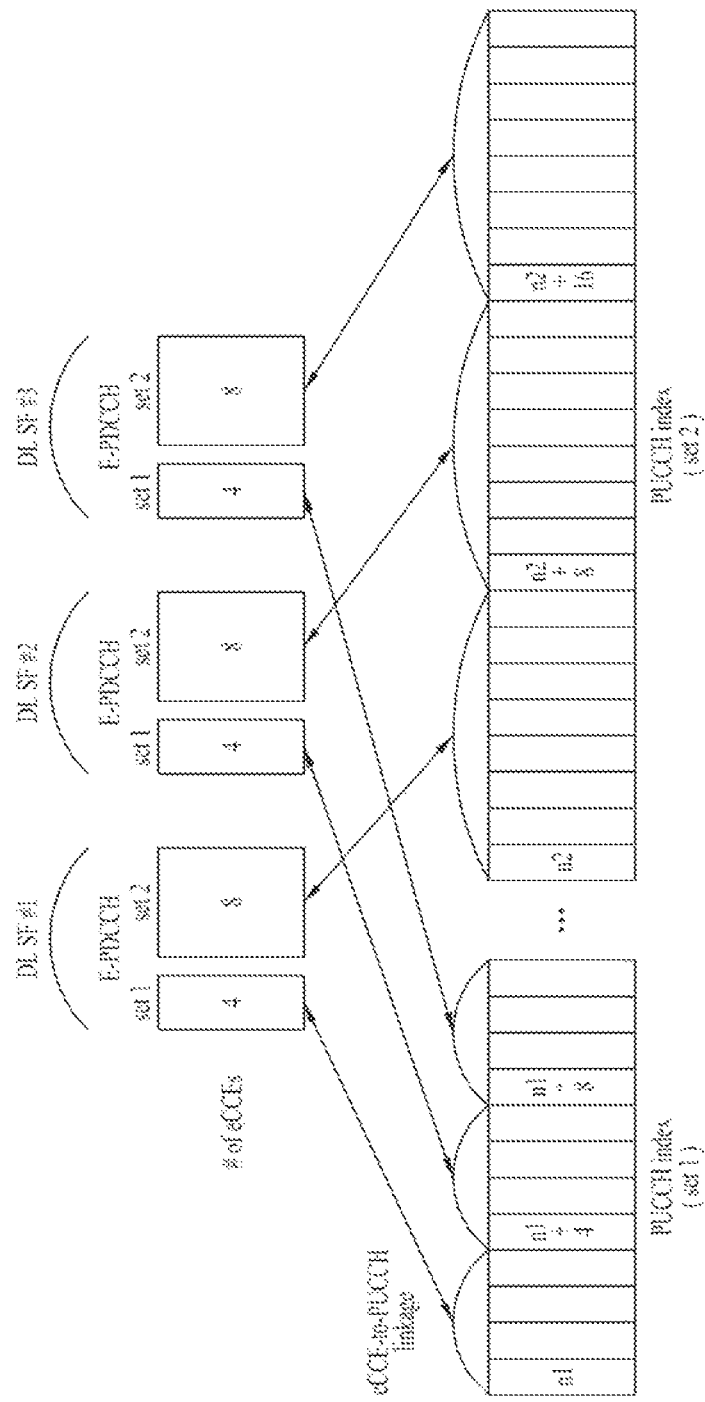
FIG. 19 illustrates an example of allocating PUCCH resources when a plurality of E-PDCCH sets is configured in TDD according to the present invention.

FIG. 19 illustrates an example of allocating PUCCH resources when a plurality of E-PDCCH sets is configured in TDD according to the present invention. FIG. 19 shows a case in which 4 eCCEs and 8 eCCEs respectively belong to E-PDCCH set 1 and E-PDCCH set 2 and DL SFs #1, #2 and #3 correspond to UL SF #1 while starting PUCCH resources/indices for E-PDCCH set 1 and E-PDCCH set 2 are respectively set to n1 and n2. In this case, the SF offset may be 12 (=4+8) according to option-1 and may be 4 and 8 respectively for E-PDCCH sets 1 and 2 according to option-2. FIG. 19 illustrates option-2. Specifically, the starting PUCCH resource/index linked to each DL SF (i.e. eCCE of each DL SF) may be determined according to the following options. For efficient multiplexing with PUCCH resources/indices linked to CCEs constituting an L-PDCCH, a specific value considering use of CCEs may be added to the SF offset according which option is selected (e.g. the specific value may correspond to a PCFICH or a CFI value extracted from the PCFICH).

[Option-1]
E-PDCCH set 1 (with SF offset of 12)
DL SF #1: n1
DL SF #2: n1+12
DL SF #3: n1+24
E-PDCCH set 2 (with SF offset of 12)
DL SF #1: n2
DL SF #2: n2+12
DL SF #3: n2+24
[Option-2]
E-PDCCH set 1 (with SF offset of 4)
DL SF #1: n1
DL SF #2: n1+4
DL SF #3: n1+8
E-PDCCH set 2 (with SF offset of 8)
DL SF #1: n2
DL SF #2: n2+8
DL SF #3: n2+16

Considering eCCE resources overlapping between E-PDCCH sets, only one PUCCH resource is sufficient to be linked to the overlapping eCCEs, and thus consideration of overlap and allocation of PUCCH resources in determination of the SF offset, as described above (or according to a different scheme) may be advantageous in terms of PUCCH resource operation efficiency. Accordingly, the present invention proposes determination of the SF offset in consideration of allocation of only one PUCCH to the overlap eCCEs. For example, the number of overlap eCCE resources may be subtracted from the SF offset.

It is assumed that two eCCE resources belonging to E-PDCCH sets 1 and 2 overlap in FIG. 19. In this case, the SF offset may be 10 (=4+8-2) in option-1. The SF offset may be 4 in case of E-PDCCH set 1 and 6 (=8-2) in case of E-PDCCH set 2 in option-2 (on the assumption that a PUCCH resource linked to the overlapping eCCE resources is allocated only to E-PDCCH set 1). Accordingly, the starting PUCCH resource/index linked to each DL SF (eCCE in each DL SF) may be determined according to following options.

[Option-1]
E-PDCCH set 1 (with SF offset of 10)
DL SF #1: n
DL SF #2: n1+10
DL SF #3: n1+20
E-PDCCH set 2 (with SF offset of 10)
DL SF #1: n2
DL SF #2: n2+10
DL SF #3: n2+20
[Option-2]
E-PDCCH set 1 (with SF offset of 4)
DL SF #1: n1
DL SF #2: n1+4
DL SF #3: n1+8
E-PDCCH set 2 (with SF offset of 6)
DL SF #1: n2
DL SF #2: n2+6
DL SF #3: n2+12

In the case of E-PDCCH based scheduling, an ACK/NACK transmission resource may be determined as a PUCCH resource linked to a specific (e.g. lowest) eCCE index corresponding to a DL grant E-PDCCH or a PUCCH resource linked to [the specific eCCE index corresponding to the DL grant E-PDCCH+offset according to ARI (and/or AP)]. Accordingly, the present invention proposes addition of [a minimum value or a maximum value (absolute value thereof) of ARI offsets, AP offsets or the sums of ARI offsets and AP offsets or the sum of the minimum value and maximum value] to the SF offset in order to stably secure/improve the degree of freedom of DL grant E-PDCCH scheduling (e.g. eCCE selection and ARI/AP configuration) through flexible PUCCH resource operation/control.

Specifically, if ARI may have offset values of −2, 0, 2 and 4 and AP may have offsets of 0, 1, 2 and 3, then (minimum absolute value, maximum absolute value, the sum of minimum and maximum absolute values) of the ARI offsets is (2, 4, 6), (minimum absolute value, maximum absolute value, the sum of minimum and maximum absolute values) of the AP offsets is (0, 3, 3) and (minimum absolute value, maximum absolute value, the sum of minimum and maximum absolute values) of the sums of the ARI offsets and AP offsets is (2, 7, 9). When ARI offsets are −1, 0, 1 and 2 and AP offsets are 0, 1, 2 and 3, (minimum absolute value, maximum absolute value, the sum of minimum and maximum absolute values) of the ARI offsets is (1, 2, 3), (minimum absolute value, maximum absolute value, the sum of minimum and maximum absolute values) of the AP offsets is (0, 3, 3) and (minimum absolute value, maximum absolute value, the sum of minimum and maximum absolute values) of the sums of the ARI offsets and AP offsets is (1, 5, 6).

According to the proposed method, values obtained by adding the proposed offset values to the SF offset may be set to final SF offset values. Here, AP offset may be determined from only AP offset values set to one or more eCCE resources having the highest index in an E-PDCCH set.

Considering a CSS configured in the structure/form of the E-PDCCH, it may be necessary to set/allocate a PUCCH resource/index used to transmit ACK/NACK feedback for DL data scheduled through the CSS. For this, 1) how the starting PUCCH resource/index corresponding to the CSS is set, 2) how many PUCCH resources/indices are allocated and how the PUCCH resources/indices are allocated and 3) how PUCCH resources/indices per DL SF are stacked in case of TDD need to be considered for the E-PDCCH based CSS.

First, an independent starting PUCCH resource/index may be set as the starting PUCCH resource/index corresponding to the CSS, separately from the USS. The starting PUCCH resource/index corresponding to the CSS may be cell-specifically set through a PBCH, SIB, etc. or UE-specifically set through RRC signaling ("separate starting PUCCH"). In addition, the starting PUCCH resource/index corresponding to the CSS may be set to the starting PUCCH resource/index set for a specific E-PDCCH set ("reference USS set") among E-PDCCH sets for the USS or a PUCCH resource/index corresponding to [the PUCCH resource/index+a predetermined offset] ("common starting PUCCH").

The number of PUCCH resources/indices corresponding to the CSS may correspond to the number of E-PDCCH candidates that constitute the CSS (rather than the number of eCCE resources constituting the CSS). Also, the number of PUCCH resources/indices corresponding to the CSS may be set to the number of E-PDCCH candidates having different starting eCCE resources. In addition, in the case of indexing of PUCCH resources (corresponding to E-PDCCH candidates), lower PUCCH indices may be first linked to lower eCCE indices and/or lower ALs.

In the case of separate starting PUCCH in TDD, the SF offset for stacking of PUCCH resources corresponding to the CSS may be set to the number of E-PDCCH candidates ("CSS candidate num") which constitute the CSS based on the aforementioned PUCCH allocation method (and/or have different starting eCCE resources). In the case of common starting PUCCH, the SF offset for PUCCH stacking with respect to the reference USS set may be set to a value obtained by adding "CSS candidate num" to the SF offset determined by option-1 or option-2 (or other methods). In the case of common starting PUCCH, PUCCH resources corresponding to the USS which are more likely to be used for DL data scheduling (DL grant E-PDCCH) may be stacked first (e.g. the PUCCH resources having lower PUCCH indices) and then PUCCH resources corresponding to the CSS may be stacked (e.g. the PUCCH resources having higher PUCCH indices).

Figure 20:
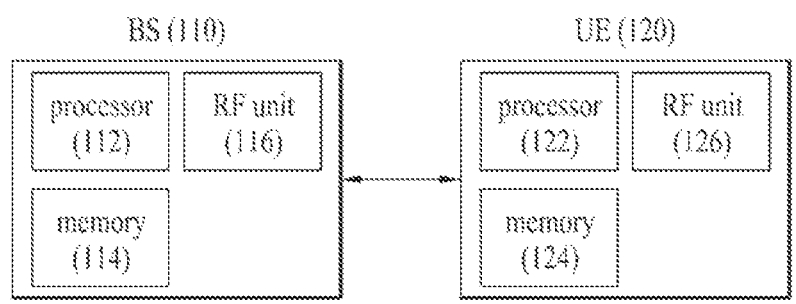
FIG. 20 illustrates a base station (BS) and UE applicable to embodiments of the present invention.

FIG. 20 illustrates a BS and a UE of a wireless communication system, which are applicable to embodiments of the present invention. When the wireless communication system includes a relay, the BS or UE can be replaced by the relay.

Referring to FIG. 20, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication apparatus such as a UE, relay, BS, etc.

The invention claimed is:

1. A method for transmitting a hybrid automatic repeat request (HARQ) response by a user equipment (UE) in a wireless communication system, the method comprising:
    receiving, by the UE, an enhanced physical downlink control channel (E-PDCCH) signal corresponding to one E-PDDCH set of two E-PDCCH sets configured for the UE, each E-PDCCH set including a plurality of resource units and having a unique E-PDCCH set index; and
    transmitting, by the UE, the HARQ response using a physical uplink control channel (PUCCH) resource determined by the UE based on a specific index of one resource unit of the plurality of resource units that exists in each of the two E-PDCCH sets,
    wherein the specific index is a resource unit index for the one resource unit that exists within one of the two E-PDCCH sets having a lowest E-PDCCH set index when each of specific condition i), specific condition ii) and specific condition iii) described below is satisfied:
    specific condition i)—two of E-PDCCH sets are scrambled with a same sequence,
    specific condition ii)—the UE is configured to monitor E-PDCCH candidates that are included in the two E-PDCCH sets and that have a same attribute,
    specific condition iii)—the E-PDCCH candidates are mapped to a same physical resource.

2. The method according to claim 1, wherein the E-PDCCH candidates having the same attribute include E-PDCCH candidates having a same downlink control information (DCI) payload size.

3. The method according to claim 1, wherein the E-PDCCH candidates having the same attribute include E-PDCCH candidates having a same radio network temporary identifier (RNTI).

4. The method according to claim 3, wherein the RNTI includes a cell-RNTI (C-RNTI) or a semi-persistent scheduling (SPS) C-RNTI.

5. The method according to claim 1, wherein each E-PDCCH set includes one or more physical resource blocks (PRBs) and the plurality of resource units includes a plurality of enhanced control channel elements (eCCEs).

6. The method according to claim 1, further comprising receiving a physical downlink shared channel (PDSCH) signal indicated by the E-PDCCH signal,
    wherein the HARQ response includes acknowledgement information for the PDSCH signal.

7. The method according to claim 1, wherein, when the E-PDCCH signal includes information indicating SPS release, the HARQ response includes acknowledgement information for the E-PDCCH signal.

8. The method according to claim 1, wherein the plurality of resource units are resource units of a second region of two regions of a subframe, and specific condition iii) comprises the E-PDCCH candidates are mapped to a same physical resource in the second region.

9. A UE configured to transmit a HARQ response in a wireless communication system, the UE comprising:
    a radio frequency (RF) unit; and
    a processor operatively connected to the RF unit and configured to:
        receive an enhanced physical downlink control channel (E-PDCCH) signal corresponding to one E-PDDCH set of two E-PDCCH sets configured for the UE, each E-PDCCH set including a plurality of resource units and having a unique E-PDCCH set index; and
        transmit the HARQ response using a physical uplink control channel (PUCCH) resource determined by the UE based on a specific index of one resource unit of the plurality of resource units that exists in each of the two E-PDCCH sets,
    wherein the specific index is a resource unit index for the one resource unit that exists within one of the two E-PDCCH sets having a lowest E-PDCCH set index when each of specific condition i), specific condition ii) and specific condition iii) described below is satisfied:
    specific condition i)—two of E-PDCCH sets are scrambled with a same sequence,
    specific condition ii)—the UE is configured to monitor E-PDCCH candidates that are included in the two E-PDCCH sets and that have a same attribute,
    specific condition iii)—the E-PDCCH candidates are mapped to a same physical resource.

10. The UE according to claim 9, wherein the E-PDCCH candidates having the same attribute include E-PDCCH candidates having a same DCI payload size.

11. The UE according to claim 9, wherein the E-PDCCH candidates having the same attribute include E-PDCCH candidates having a same RNTI.

12. The UE according to claim 11, wherein the RNTI includes a C-RNTI or an SPS C-RNTI.

13. The UE according to claim 9, wherein each E-PDCCH set includes one or more PRBs and the plurality of resource units includes a plurality of eCCEs.

14. The UE according to claim 9, wherein the processor is configured to further receive a PDSCH signal indicated by the E-PDCCH signal,
    wherein the HARQ response includes acknowledgement information for the PDSCH signal.

15. The UE according to claim 9, wherein, when the E-PDCCH signal includes information indicating SPS release, the HARQ response includes acknowledgement information for the E-PDCCH signal.

16. The UE according to claim 9, wherein the plurality of resource units are resource units of a second region of two regions of a subframe, and specific condition iii) comprises the E-PDCCH candidates are mapped to a same physical resource in the second region.

* * * * *